US008890347B2

(12) United States Patent
Tanaka et al.

(10) Patent No.: US 8,890,347 B2
(45) Date of Patent: Nov. 18, 2014

(54) WIND POWER GENERATION SYSTEM AND CONTROL METHOD FOR THE SAME

(75) Inventors: Motofumi Tanaka, Yokohama (JP); Hisashi Matsuda, Tokyo (JP); Kunihiko Wada, Yokohama (JP); Hiroyuki Yasui, Yokohama (JP); Shohei Goshima, Yokohama (JP); Naohiko Shimura, Atsugi (JP); Yutaka Ishiwata, Zushi (JP); Susumu Kinoshita, Oume (JP); Tamon Ozaki, Fuchu (JP); Sueyoshi Mizuno, Fuchu (JP); Shinichi Noda, Kawasaki (JP); Toshiki Osako, Kawasaki (JP); Toshimasa Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 140 days.

(21) Appl. No.: 13/462,041

(22) Filed: May 2, 2012

(65) Prior Publication Data
US 2012/0280501 A1 Nov. 8, 2012

(30) Foreign Application Priority Data

May 2, 2011 (JP) .............................. P2011-103083
Mar. 23, 2012 (JP) .............................. P2012-066706

(51) Int. Cl.
F03D 9/00 (2006.01)
(Continued)

(52) U.S. Cl.
CPC ............... *F03D 7/022* (2013.01); *Y02E 10/723* (2013.01); *F05B 2270/304* (2013.01);
(Continued)

(58) Field of Classification Search
CPC ....... F03D 7/022; F03D 7/0256; F03D 11/00; F05B 2270/304; F05B 2270/335; F05B 2270/327; Y02E 10/721; Y02E 10/723; Y02E 10/722; H02P 9/04; F05D 2270/172; B64C 2230/12
USPC ......................................... 290/44, 55, 54, 43
See application file for complete search history.

(56) References Cited

U.S. PATENT DOCUMENTS 7,988,101 B2 * 8/2011 Osborne et al. ............... 244/205
2009/0212164 A1   8/2009 Osborne et al.
(Continued)

FOREIGN PATENT DOCUMENTS

EP  1 995 171 A2  11/2008
EP  2 180 182 A2   4/2010
(Continued)

OTHER PUBLICATIONS

Extended European Search Report issued by the European Patent Office on Sep. 14, 2012, for European Patent Application No. 12166350.4-2321.

*Primary Examiner* — Javaid Nasri
(74) *Attorney, Agent, or Firm* — Finnegan, Henderson, Farabow, Garrett & Dunner, L.L.P.

(57) ABSTRACT

A wind power generation system 10 of an embodiment includes a rotor 40 having a hub 41 and blades 42, a nacelle 31 pivotally supporting the rotor 40, a tower 30 supporting the nacelle 31, an airflow generation device 60 provided in a leading edge of each of the blades 42 and having a first electrode 61 and a second electrode 62 which are separated via a dielectric, and a discharge power supply 65 capable of applying a voltage between the electrodes of the airflow generation device 60. Further, the system includes a measurement device detecting information related to at least one of output in the wind power generation system 10, torque in the rotor 40 and a rotation speed of the blades 42, and a control unit 110 controlling the discharge power supply 65 based on an output from the measurement device.

17 Claims, 19 Drawing Sheets

(51) Int. Cl.
 *H02P 9/04* (2006.01)
 *F03D 7/02* (2006.01)
 *F03D 11/00* (2006.01)

(52) U.S. Cl.
 CPC ............. *F03D 7/0256* (2013.01); *Y02E 10/721* (2013.01); *F05B 2270/335* (2013.01); *F03D 11/00* (2013.01); *F05B 2270/327* (2013.01); *Y02E 10/722* (2013.01)
 USPC .......................................................... 290/44

(56) References Cited

U.S. PATENT DOCUMENTS

2010/0104436 A1   4/2010   Herr et al.
2010/0123046 A1   5/2010   Khozikov et al.
2012/0068469 A1   3/2012   Behrens et al.

FOREIGN PATENT DOCUMENTS

GB   2469854 A   11/2010
JP   2008-025434   2/2008

* cited by examiner

WIND POWER GENERATION SYSTEM AND CONTROL METHOD FOR THE SAME

CROSS-REFERENCE TO RELATED APPLICATIONS

This application is based upon and claims the benefit of priority from Japanese Patent Application No. 2011-103083, filed on May 2, 2011; and Japanese Patent Application No. 2012-066706, filed on Mar. 23, 2012; the entire contents of which are incorporated herein by reference.

FIELD

Embodiments described herein relate generally to a wind power generation system and a control method for the same.

BACKGROUND

Currently, in view of global warming prevention, introduction of renewable energy generation systems is in progress in the global scale. In such a circumstance, wind power generation is one of power generation methods which are being popularized. However, in Japan, the popularization rate of wind power generation is low compared to that in Europe or the like.

The reason for the difficulty of popularization of wind power generation in Japan is largely because of its geographical constraints. In particular, in Japan, wind force and direction change rapidly due to the mountain climate, making it difficult to maintain stable outputs in wind power generation. Such factors cause decrease in power generation efficiency per windmill, and consequently raise introduction costs of wind power generation systems.

To introduce large-scale wind power generation in a region where a wind velocity and direction change rapidly like in Japan, it becomes necessary to develop windmills which are variation resistant and overcome these problems. Accordingly, there is proposed a wind power generation system in which an airflow generation device generating plasma induced flow by plasma generated by applying a voltage between electrodes disposed to face each other via a dielectric is disposed on a blade surface of a windmill, to thereby enable control corresponding to variation of wind.

However, until now, there has been presented no case example in which the airflow generation device is actuated in an actual rotation field so as to confirm an effect on windmill efficiency. Thus, it becomes necessary to establish a voltage application method in an optimum airflow generation device, an operating method for controlling a stall state on blades to improve efficiency, and so on in an actual windmill.

DETAILED DESCRIPTION

In one embodiment, a wind power generation system includes a rotor having a hub and at least two or more blades attached to the hub, a nacelle pivotally supporting the rotor via a rotation shaft connected to the hub, and a tower supporting the nacelle.

Further, the wind power generation system includes an airflow generation device provided in a leading edge of each of the blades, having a first electrode and a second electrode which are separated via a dielectric, and capable of generating plasma induced flow, a voltage application mechanism capable of applying a voltage between the first electrode and the second electrode of the airflow generation device, a measurement device detecting information related to at least one of output in the wind power generation system, torque in the rotor, and a rotation speed of the blades, and a control unit controlling the voltage application mechanism based on an output from the measurement device.

Hereinafter, embodiments of the present invention will be described with reference to the drawings.

Figure 1:
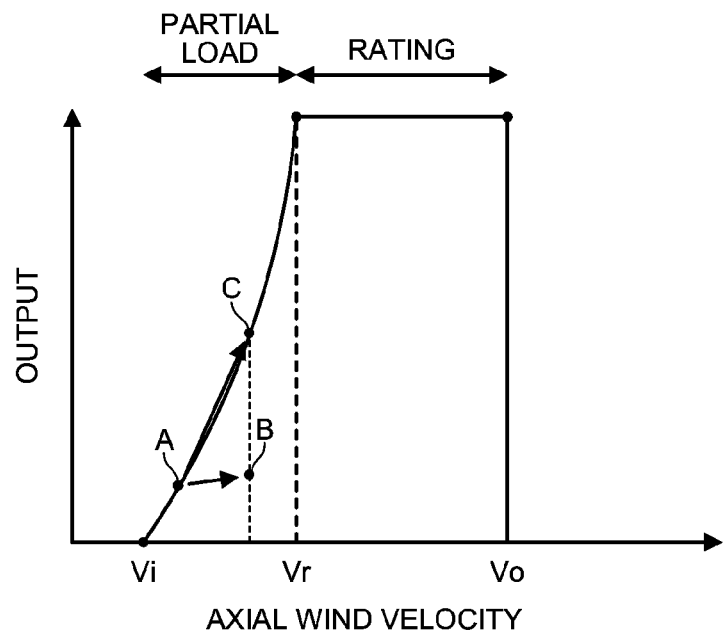
FIG. 1 is a diagram illustrating the relation in a typical windmill between an axial wind velocity and an output (power generation amount) of the windmill.

First, the relation in a typical windmill between the wind velocity and an output (power generation amount) of the windmill will be described. FIG. 1 is a diagram illustrating the relation in a typical windmill between an axial wind velocity and an output (power generation amount) of the windmill.

A diagram illustrating the relation between an axial wind velocity and an output (power generation amount) of a windmill is called a power curve. Vi illustrated on the horizontal axis of FIG. 1 denotes a cut-in axial wind velocity, yr denotes a rating axial wind velocity, and Vo denotes a cut-out axial wind velocity. The cut-in axial wind velocity Vi is a minimum axial wind velocity to generate motive power which can be used by the windmill, and the cut-out axial wind velocity Vo is a maximum axial wind velocity to generate motive power which can be used by the windmill.

Incidentally, the axial wind velocity is a velocity component of wind in a rotation shaft direction of the windmill.

The windmill overcomes starting torque of a power generator when the axial wind velocity is equal to the cut-in axial wind velocity Vi or higher and starts to rotate, and as illustrated in FIG. 1, the output increases along with increase in axial wind velocity. When the output reaches the rating of the power generator, the pitch of the blades is controlled to suppress the output to be constant so that the output does not increase even when further axial wind velocity is received. When it exceeds the cut-out axial wind velocity Vo and reaches the axial wind velocity which poses a risk of damaging the blades and tower, the pitch and yaw are controlled to stop so that the blades do not receive power from the wind.

The region from the cut-in axial wind velocity Vi to the rating axial wind velocity Vr is called a partial load region, and a region that is greater than the rating axial wind velocity Vr and is less than or equal to the cut-out axial wind velocity Vo is called a rating region. In an actual wind condition, an appearance probability of the axial wind velocity in the partial load region is high, and in the partial load region, the energy of wind is reflected straight on the output. Thus, it is required to improve wind receiving efficiency of the blades in this partial load region.

Note that although there are various definitions for the power curve, the power curve used in the following description refers to a curve representing an output logically obtained at each wind velocity when the system is operated at a design peripheral velocity ratio under a steady wind, and indicates a logical maximum output in design. Further, in the partial load region of a windmill, a certain design peripheral velocity ratio is determined, and a twist of the blades and an attachment angle of the blades to the hub are designed so that each blade element is operated with a maximum lift drag ratio at this peripheral velocity ratio. Generator torque is controlled so that the blades rotate constantly at the design peripheral velocity ratio.

Here, the present inventors found that there exists an event which cannot be represented by the power curve illustrated in FIG. 1 when there is a variation of the axial wind velocity. Specifically, it was found that, when the axial wind velocity increases in a state of operating at point A in FIG. 1, it proceeds not to point C on the power curve but to point B which is smaller in output. Thereafter, it was found that the power is stable at the point B even when it is thereafter kept at the same axial wind velocity for long time.

Figure 2:
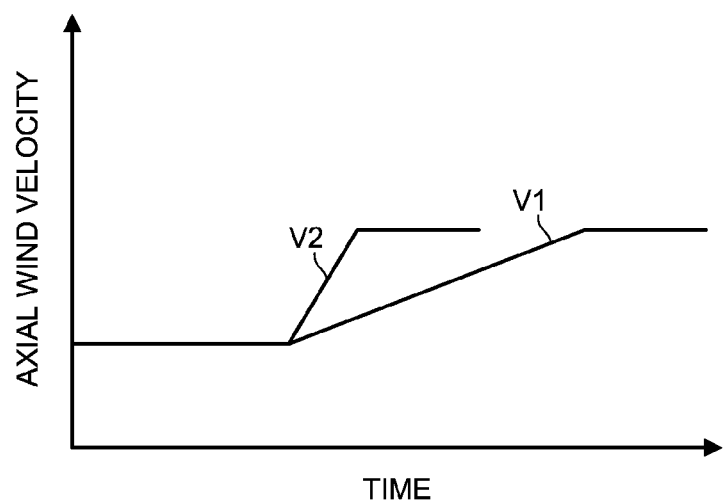
FIG. 2 is a diagram illustrating a variation in an axial wind velocity in the typical windmill.

The test was further repeated while varying the increase ratio of the axial wind velocity. FIG. 2 is a diagram illustrating a variation in an axial wind velocity in the typical windmill. When the axial wind velocity increases gradually as V1 illustrated in FIG. 2, the output increased along the power curve as when it proceeds to the point C illustrated in FIG. 1. On the other hand, when the axial wind velocity increases rapidly as V2 illustrated in FIG. 2, the output deviates from the power curve as when it proceeds to the point B illustrated in FIG. 1, turning to a state that the output do not increase. This state will be hereinafter referred to as a complete stall state. Under natural winds which vary largely in wind velocity and direction, a wind velocity increase occurs often with such various time constants.

Further, it was found that a similar phenomenon occurs when there is a velocity distribution in a height direction from the ground or when the rotation plane of a windmill does not face the wind direction.

The present inventors have found new measurements to capture an event that the complete stall state occurs as described above and, when this complete stall state occurs, enable control to quickly solve this state and obtain the output along the power curve.

Hereinafter, a wind power generation system 10 of the embodiment will be described.

Figure 3:
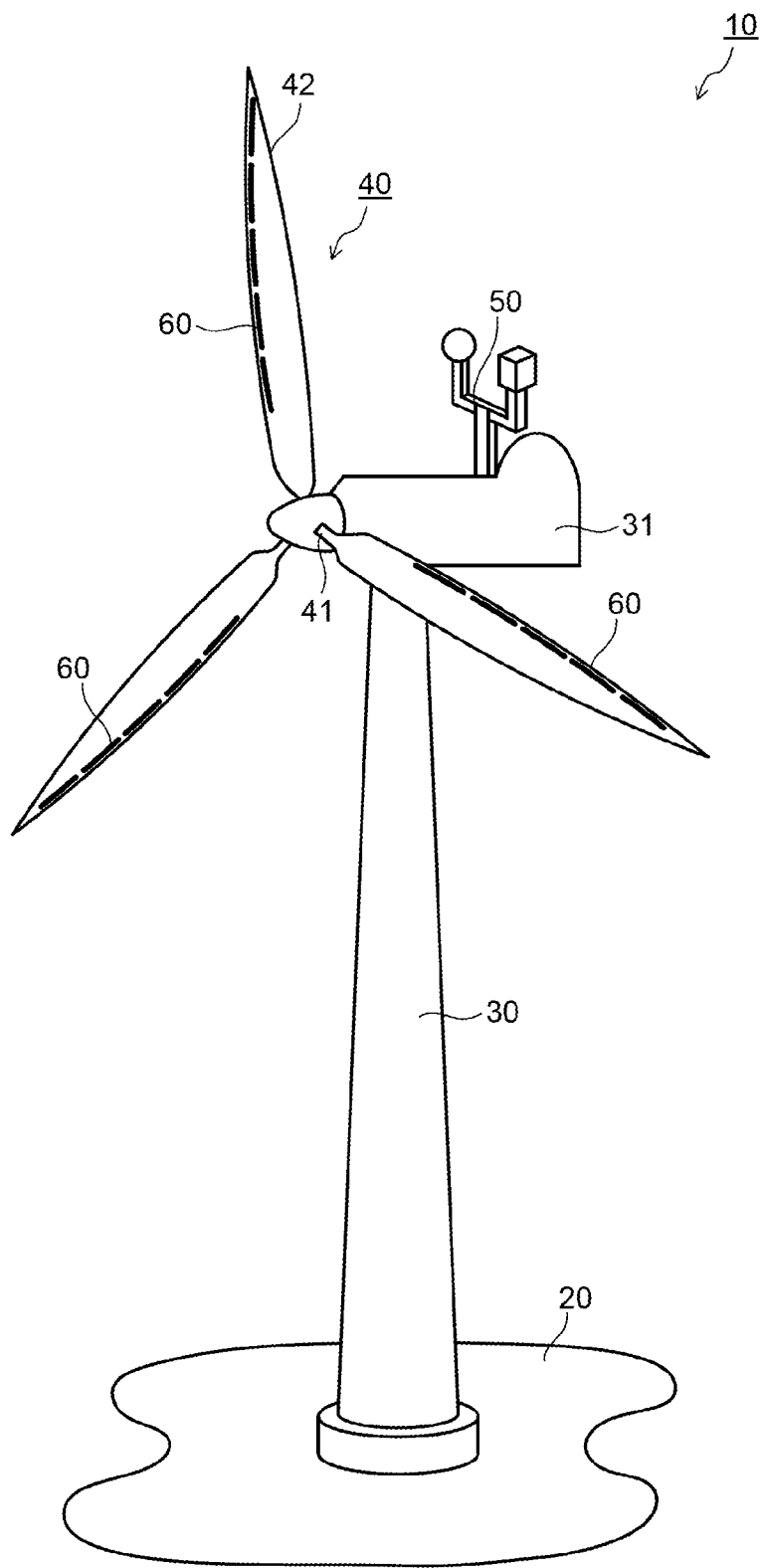
FIG. 3 is a perspective view illustrating a wind power generation system of an embodiment.
Figure 4:
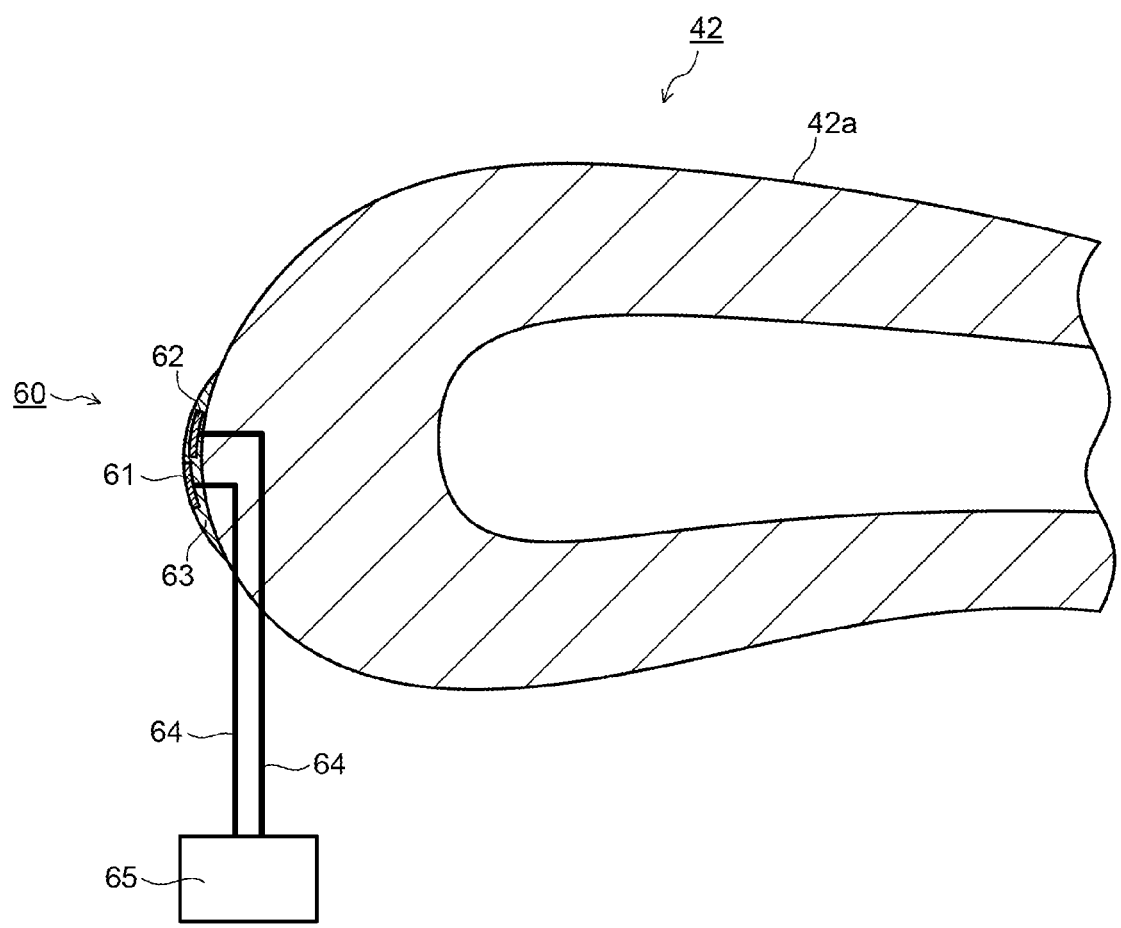
FIG. 4 is a view illustrating a cross-section of a leading edge of a blade for describing an airflow generation device provided in the wind power generation system of the embodiment.

FIG. 3 is a perspective view illustrating the wind power generation system 10 of the embodiment. FIG. 4 is a view illustrating a cross section of a leading edge of a blade 42, for describing an airflow generation device 60 provided in the wind power generation system 10 of the embodiment. Note that in the following, the same reference numerals are added to the same components, and duplicating descriptions are omitted or simplified.

As illustrated in FIG. 3, in the wind power generation system 10, a nacelle 31 housing a generator (not illustrated) and so on is attached to a top portion of a tower 30 installed on a ground 20. Further, a rotor 40 is pivotally supported on a rotation shaft of the generator projecting from the nacelle 31.

The rotor 40 has a hub 41 and blades 42 attached to this hub 41. Further, the blades 42 are provided in a manner that their pitch angle is variable. Note that although an example of having three blades 42 is presented here, at least two or more blades 42 may be provided. On an upper face of the nacelle 31, as illustrated in FIG. 3, an aerovane 50 for measuring wind direction and velocity of wind is provided. Further, although an example of having the blades 42 in a manner that their pitch angle is variable is presented here, they may be blades of which pitch angle is not controllable. Further, although an example of having the blades 42 in a manner that their pitch angle is variable is presented here, they may be blades of which pitch angle is not controllable.

In the leading edge of a blade 42, as illustrated in FIG. 4, an airflow generation device 60 is provided. The airflow generation device 60 has a first electrode 61 and a second electrode 62 disposed separately from the first electrode 61 via a dielectric 63. Here, the airflow generation device 60 is presented having a structure in which the first electrode 61 is provided on a surface of the dielectric 63, and the second electrode 62 is embedded in the dielectric 63. Note that a dielectric material for forming the dielectric 63 is not particularly limited, and can be chosen appropriately from publicly known dielectric materials formed of a solid depending on the application and environment it is used for.

Note that the structure of the airflow generation device 60 is not limited to them. For example, it may be structured such that a trench is formed in the blade 42, and a structure formed of the first electrode 61, the second electrode 62 and the dielectric 63 is provided to fit in this trench, so that the airflow generation device 60 does not project from the surface of the blade 42. In this case, when the blade 42 is formed of, for example, a dielectric material such as GFRP (glass fiber reinforced plastics) in which glass fibers are solidified with a synthetic resin, the blade 42 itself can be allowed to function as the dielectric 63. Specifically, the first electrode 61 can be disposed directly on the surface of the blade 42, and the second electrode 62 can be embedded directly in the blade 42 separately from this first electrode 61.

Here, for example, the first electrode 61 can be disposed so that an edge of the first electrode 61 on the second electrode 62 side is on the leading edge of the blade 42, and the second electrode 62 can be disposed at a position on a suction side 42a of the blade 42 relative to the first electrode 61. It should be noted that the placement position of the airflow generation device 60 only needs to be a position where it can control the separation and so on occurring in the blade surface and is not particularly limited. For example, to control flow properly, the disposing position of the airflow generation device 60 is preferred to be the leading edge of the blade 42.

Thus, in the airflow generation device 60, the first electrode 61 and the second electrode 62 are disposed so that generated plasma induced flow flows from the first electrode 61 toward the second electrode 62 side. For example, in the airflow generation device 60 illustrated in FIG. 4, the plasma induced flow flows from the leading edge of the blade 42 toward the suction side 42a of the blade face.

A plurality of airflow generation devices 60 are disposed independently in a blade span direction from a blade root portion toward a blade edge portion of the blades 42, as illustrated in FIG. 3 for example. In this case, each airflow generation device 60 can be controlled independently. For example, a voltage applied between the first electrode 61 and the second electrode 62 can be controlled in each airflow generation device 60. Note that when the blade span is small, for example, one airflow generation device 60 may be disposed in the blade span direction in the leading edge of the blade 42.

The first electrode 61 and the second electrode 62 are, as illustrated in FIG. 4, connected electrically to a discharge power supply 65 functioning as a voltage application mechanism, via cables 64 respectively. By activating this discharge power supply 65, a voltage is applied between the first electrode 61 and the second electrode 62.

The discharge power supply 65 is capable of applying, for example, a pulse modulation controlled voltage in a pulse form (positive, negative, or bipolar (alternate voltage)), a voltage having a waveform in an alternate form (sinusoidal wave or intermittent sinusoidal wave), or the like between the first electrode 61 and the second electrode 62. Thus, the discharge power supply 65 is capable of applying a voltage between the first electrode 61 and the second electrode 62 while varying current-voltage properties such as voltage value, frequency, current waveform, and duty ratio.

For example, when the plurality of airflow generation devices 60 are provided, the discharge power supply 65 may be provided for each of the airflow generation devices 60, or may be structured of one power supply having a function capable of controlling the voltage of each airflow generation device 60 independently.

Figure 5:
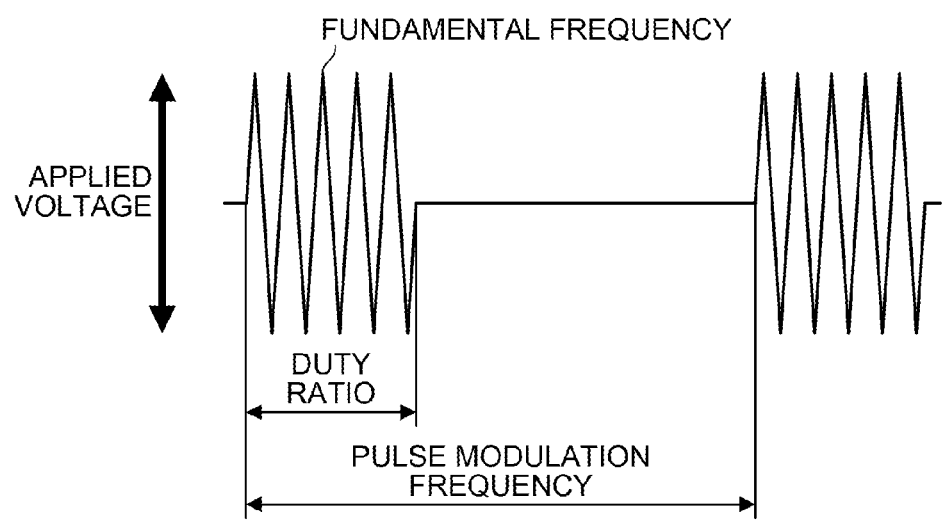
FIG. 5 is a diagram for describing an overview of pulse modulation control in the wind power generation system of the embodiment.

Here, FIG. 5 is a diagram for describing an overview of pulse modulation control in the wind power generation system 10 of the embodiment. A control method to turn the applied voltage from the discharge power supply 65 on for a predetermined time (ON) and off for a predetermined time (OFF) as illustrated in FIG. 5 is called a pulse modulation control, and the frequency thereof is called a pulse modulation frequency f. Further, the fundamental frequency described in FIG. 5 is the frequency of the applied voltage.

For example, when the voltage is controlled to perform pulse modulation, the pulse modulation frequency f is preferred to be set to satisfy the following relational expression (1).

$$0.1 \leq fC/U \leq 0 \qquad \text{Expression (1)}$$

Here, C is a chord length of the blade 42 in a blade portion where the airflow generation device 60 is provided. U is a relative velocity combining a peripheral velocity of the blade and a wind velocity in the blade portion where the airflow generation device 60 is provided. Note that when the plurality of airflow generation devices 60 are provided in the blade span direction as illustrated in FIG. 3, one airflow generation device 60 has a predetermined width in the blade span direction. Thus, in one airflow generation device 60, the chord length C and the relative velocity U vary in the width direction of this airflow generation device 60. Accordingly, it is preferred to use, as the chord length C and the relative velocity U, an average value in the blade span direction in the blade portion where each airflow generation device 60 is provided.

Here, by setting the pulse modulation frequency f to satisfy the above relational expression, even when the above-described complete stall state at the point B illustrated in FIG. 1 occurs, it is possible to reliably proceed to a regular state along the power curve (for example at the point C of FIG. 1).

Next, a control method for the wind power generation system 10 will be described.

CONTROL EXAMPLE 1

Figure 6:
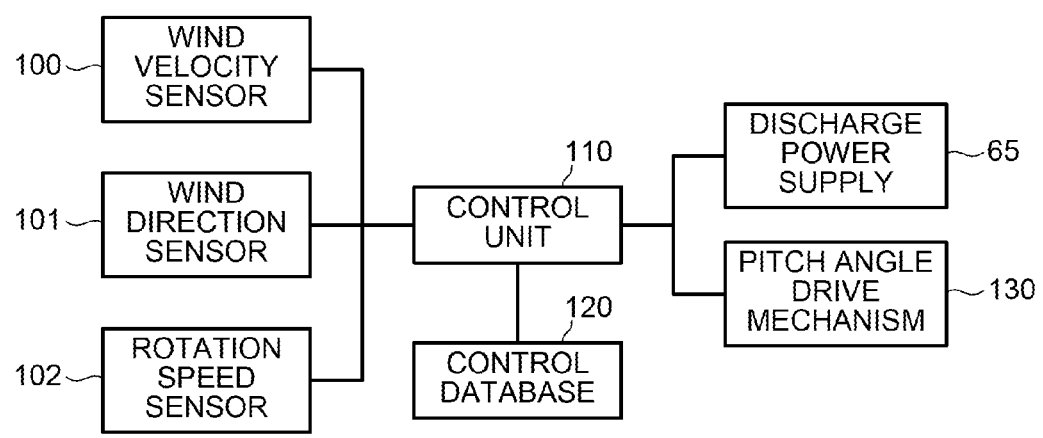
FIG. 6 is a diagram schematically illustrating a control structure of the wind power generation system of the embodiment.

FIG. 6 is a diagram schematically illustrating a control structure of the wind power generation system 10 of the embodiment.

As illustrated in FIG. 6, the wind power generation system 10 includes a wind velocity sensor 100, a wind direction sensor 101, a rotation speed sensor 102, a control unit 110, a control database 120, a discharge power supply 65, and a pitch angle drive mechanism 130.

The wind velocity sensor 100 is a sensor for measuring the velocity of wind flowing onto the blades 42. The wind direction sensor 101 is a sensor for measuring the direction of wind flowing onto the blades 42. These wind velocity sensor 100 and wind direction sensor 101 are formed of the aerovane 50 or the like provided on an upper side face of the nacelle 31, as illustrated in FIG. 3 for example.

The rotation speed sensor 102 is a sensor for measuring the rotation speed of the blades 42 (the rotor 40), and is provided in, for example, the nacelle 31.

The control database 120 stores data of actual output (an output calculated based on measurement data or a measurement value of output in a generator), set output, set angle of attack, pitch angle, and so on for determination based on measurement values of wind velocity, wind direction, rotation speed, and so on. For example, the set output can be stored as information related to a power curve indicating the relation between an output in a windmill and an axial wind velocity.

Further, the control database 120 stores data such as the chord length of the blades 42 (for example, an average chord length as described above), the distance from the blade root portion of the blade 42 in the blade span direction (for example, an average value in the blade span direction in the blade portion where the airflow generation device 60 is provided), and so on in the blade portion where each airflow generation device 60 is provided. Further, the control database 120 stores the above-described relational expression (1) and the range which is satisfied by this relational expression, and is used when calculating the pulse modulation frequency f.

This control database 120 is constituted of a memory, a hard disk device, and so on. Further, it is possible to input data to the control database 120 via a keyboard, a mouse, an external input interface, and/or the like which are not illustrated.

The control unit 110 calculates rotation speed, relative velocity, angle of attack, pitch angle, output or the like in the wind power generation system 10 based on information outputted from respective sensors such as the wind velocity sensor 100, the wind direction sensor 101, and the rotation speed sensor 102 and data stored in the control database 120. Note that for the output in the wind power generation system 10, a measurement value of output of the generator may be used. Further, a set output and so on set in advance in the wind power generation system 10 are determined based on information outputted from the wind velocity sensor 100, information related to a power curve stored in the control database 120, and the like.

Further, the control unit 110 controls the discharge power supply 65, the pitch angle drive mechanism 130, and so on based on the above calculation results. This control unit 110 is formed mainly of, for example, an arithmetic unit (CPU), a read only memory (ROM), a random access memory (RAM), and so on, and the CPU executes various arithmetic processing using a program, data, and the like stored in the ROM or the RAM. The processing executed by this control unit 110 is achieved by a computer apparatus for example. Further, the control unit 110 is connected to respective devices such as the wind velocity sensor 100, the wind direction sensor 101, the rotation speed sensor 102, the control database 120, the discharge power supply 65, the pitch angle drive mechanism 130, and the generator in a manner that an electrical signal can be inputted therefrom/outputted thereto.

The discharge power supply 65 applies a pulse modulation controlled voltage or the like between the first electrode 61 and the second electrode 62 as described above based on information from the control unit 110.

The pitch angle drive mechanism 130 drive controls the angle of the blades 42 according to the rotation speed of the blades 42 based on information from the control unit 110. Note that when blades of which pitch angle is not controllable are used, the pitch angle drive mechanism 130 is not necessary.

Next, operation (control example 1) of the wind power generation system 10 will be described.

Figure 7:
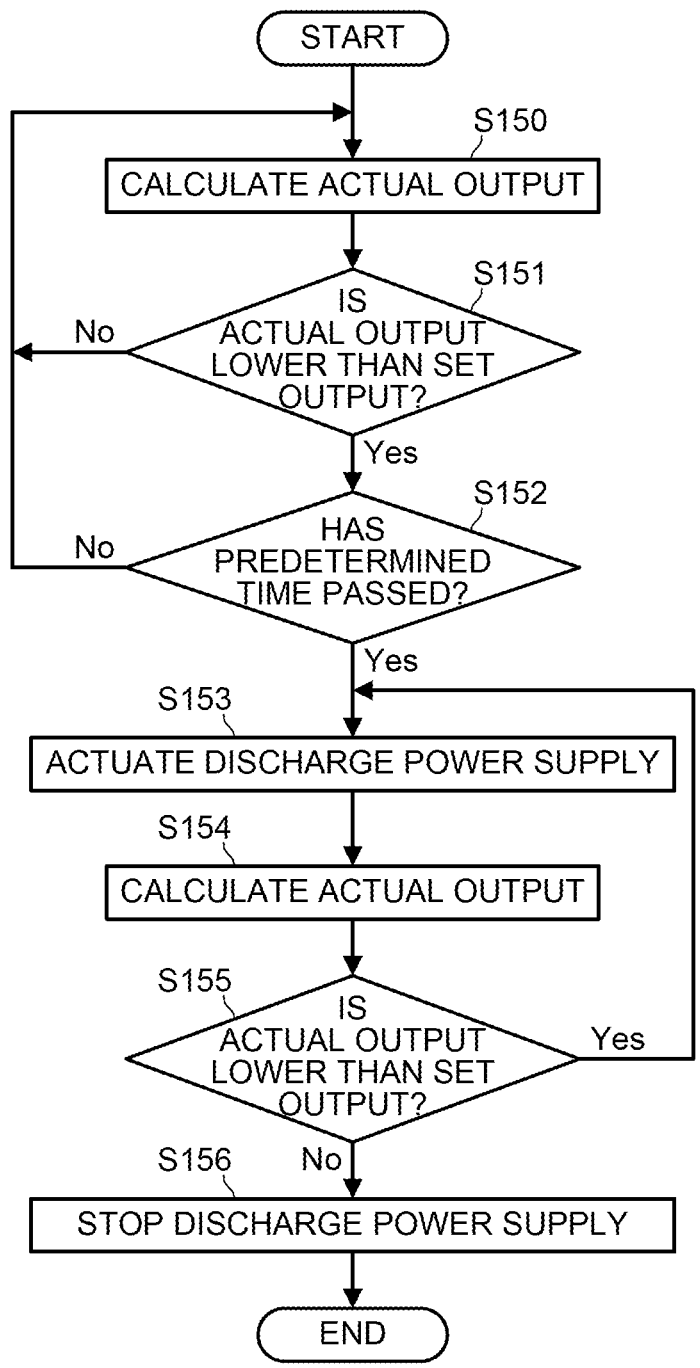
FIG. 7 is a flowchart for describing operation (control example 1) of the wind power generation system of the embodiment.

FIG. 7 is a flowchart for describing operation (control example 1) of the wind power generation system 10 of the embodiment. Note that here the case where a plurality of airflow generation devices 60 are disposed independently in the blade span direction from the blade root portion toward the blade edge portion of the blades 42 as illustrated in FIG. 3 will be described by way of illustration.

First, the control unit 110 calculates an actual output and an axial wind velocity of the wind power generation system 10 based on measurement information such as wind velocity and wind direction measured by the wind velocity sensor 100 and the wind direction sensor 101, the rotation speed inputted from the rotation speed sensor 102, and the data stored in the control database 120 (step S150).

Note that as the actual output, a measurement value of the output of the generator may be used. The axial wind velocity is calculated based on measurement information such as wind velocity and wind direction.

Subsequently, the control unit 110 reads from the data stored in the control database 120 a set output which is set in advance in the wind power generation system 10 at the axial wind velocity when this actual output is obtained, and compares it with the actual output. Then the control unit 110 determines whether the actual output is lower than the set output or not (step S151).

Here, the actual output being lower than the set output refers to that the actual output is lower than the set output by, for example, 80%.

When it is determined in step S151 that the actual output is not lower than the set output (No in step S151), the processing of step S150 is executed again.

On the other hand, when it is determined in step S151 that the actual output is lower than the set output (Yes in step S151), the control unit 110 determines whether a predetermined time has passed or not since the actual output changed to the state of being lower than the set output (step S152).

Here, the predetermined time is set to about 5 to 10 seconds. By setting this predetermined time, it is possible to discriminate between an output response delay due to inertia of the rotor and an output decrease due to separation stall. Further, it is possible to exclude the case where the actual output is momentarily, not continuously, in a state of being lower than the set output.

When it is determined in step S152 that the predetermined time has not passed since the actual output changed to the state of being lower than the set output (No in step S152), the processing of step S150 is executed again.

On the other hand, when it is determined in step S152 that the predetermined time has passed since the actual output changed to the state of being lower than the set output (Yes in step S152), the control unit 110 actuates the discharge power supply 65 to apply a pulse modulation controlled voltage between the first electrode 61 and the second electrode 62 of the airflow generation device 60, so as to generate plasma induced flow (step S153).

Note that, at this moment, the control unit 110 sets the pulse modulation frequency f so as to satisfy the above-described relational expression (1). When the potential difference between the first electrode 61 and the second electrode 62 is equal to or larger than a certain threshold, discharge is induced in the vicinity of the first electrode 61. Electrons and ions generated at this moment are driven by an electric field, and by their collision with air molecules, their momentum is transferred to the air molecules. Thus, the plasma induced flow is generated in the vicinity of the first electrode 61.

Subsequently, the control unit 110 calculates an actual output functioning as a second actual output and an axial wind velocity of the wind power generation system 10 in a state that the airflow generation device 60 is actuated, based on measurement information such as the wind velocity and the wind direction measured by the wind velocity sensor 100 and the wind direction sensor 101, the rotation speed inputted from the rotation speed sensor 102, and the data stored in the control database 120 (step S154). Note that as the actual output, a measurement value of the output of the generator may be used.

Subsequently, the control unit 110 reads from the data stored in the control database 120 a set output which is set in advance, functioning as a second set output of the wind power generation system 10, at the axial wind velocity when this actual output (second actual output) is obtained, and compares it with the actual output (second actual output).

Then, the control unit 110 determines whether the actual output (second actual output) is lower than the set output (second set output) or not (step S155).

Here, the actual output (second actual output) being lower than the set output (second set output) refers to that, similarly to the above-described case, the actual output (second actual output) is lower than the set output (second set output) by, for example, 80%. Note that the control unit 110 may determine whether or not the actual output (second actual output) has reached, for example, 80% or more of the set output (second set output) instead of determining whether or not the actual output (second actual output) is lower than the set output (second set output).

When it is determined in step S155 that the actual output (second actual output) is lower than the set output (second set output) (Yes in step S155), the processing from step S153 is executed again. That is, the state that the airflow generation device 60 is actuated is maintained.

On the other hand, when it is determined in step S155 that the actual output (second actual output) is not lower than the set output (second set output) (No in step S155), the control unit 110 stops the actuation of the discharge power supply 65 to stop the application of voltage between the first electrode 61 and the second electrode 62 of the airflow generation device 60 (step S156).

Here, even when the airflow generation device 60 is stopped after the actual output (second actual output) has proceeded to the state of being not lower than the set output (second set output), this state can be maintained. Thus, the actual output (second actual output) will not proceed again to the state of being lower than the set output (second set output). This suppresses the energy consumed in the airflow generation device 60 to the minimum.

Note that in the above-described operation (control example 1) of the wind power generation system 10, an example is illustrated in which the same control is performed to all of the plurality of airflow generation devices 60 provided.

By operating the wind power generation system 10 in this manner, even when the flow separates in a downstream portion of the leading edges of the blades 42, and the above-described complete stall state at the point B illustrated in FIG. 1 occurs, it is possible to reliably proceed to the regular state along the power curve (for example at the point C of FIG. 1).

Note that although an example of performing control by comparing an actual output with set outputs on a logical power curve is presented here, the control is not limited to this. The above-described control can also be achieved by, for example, comparing actual torque with logical set torque, or comparing an actual rotation speed with a logical set rotation speed. The actual torque functions as second actual torque and the actual rotation speed functions as a second actual rotation speed when the airflow generation devices 60 are actuated. Further, the set torque functions as second set torque and the set rotation speed functions as a second set rotation speed when the airflow generation devices 60 are actuated.

Here, the actual torque means rotor torque. The rotor torque may be measured with a torque meter or may be calculated from the actual output using the following relational expressions (2) and (3).

$$T{\rm rot} = I \times d\omega/dt + T{\rm gen} \qquad \text{Expression (2)}$$

$$T{\rm gen} = P/(2\pi\omega/60) \qquad \text{Expression (3)}$$

Here, Trot denotes rotor torque, Tgen denotes generator torque, I denotes moment of inertia, $\omega$ denotes the rotation speed (rpm) of the blades 42 (rotor 40), and P denotes an actual output.

CONTROL EXAMPLE 2

Here, in addition to the control of the above-described control example 1, it is structured such that control based on an angle of attack in the leading edges of the blades 42 is added, and the airflow generation devices 60 are controlled separately. Note that the control structure of the wind power generation system 10 is the same as that illustrated in FIG. 6.

Operation (control example 2) of the wind power generation system 10 will be described.

Figure 8:
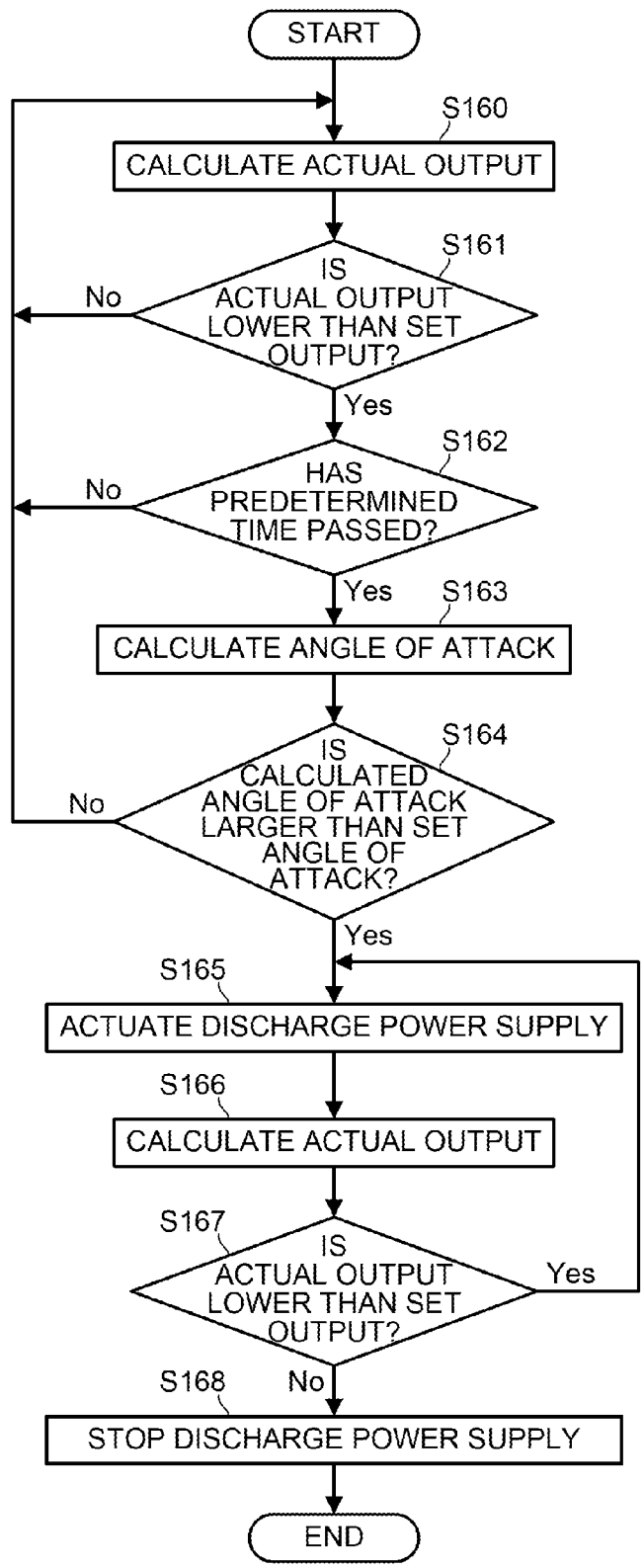
FIG. 8 is a flowchart for describing operation (control example 2) of the wind power generation system of the embodiment.

FIG. 8 is a flowchart for describing operation (control example 2) of the wind power generation system 10 of the embodiment. Note that here the case where a plurality of airflow generation devices 60 are disposed independently in the blade span direction from the blade root portion toward the blade edge portion of the blades 42 as illustrated in FIG. 3 will be described by way of illustration.

First, the control unit 110 calculates an actual output and an axial wind velocity of the wind power generation system 10 based on measurement information such as wind velocity and wind direction measured by the wind velocity sensor 100 and the wind direction sensor 101, the rotation speed inputted from the rotation speed sensor 102, and the data stored in the control database 120 (step S160).

Note that as the actual output, a measurement value of the output of the generator may be used. The axial wind velocity is calculated based on measurement information such as wind velocity and wind direction.

Subsequently, the control unit 110 reads from the data stored in the control database 120 a set output which is set in advance in the wind power generation system 10 at the axial wind velocity when this actual output is obtained, and compares it with the actual output. Then, the control unit 110 determines whether or not the actual output is lower than the set output (step S161).

Here, the actual output being lower than the set output refers to that the actual output is lower than the set output by, for example, 80%.

When it is determined in step S161 that the actual output is not lower than the set output (No in step S161), the processing of step S160 is executed again.

On the other hand, when it is determined in step S161 that the actual output is lower than the set output (Yes in step S161), the control unit 110 determines whether a predetermined time has passed or not since the actual output changed to the state of being lower than the set output (step S162).

Here, the predetermined time is set to about 5 to 10 seconds. By setting this predetermined time, it is possible to discriminate between an output response delay due to inertia of the rotor and an output decrease due to separation stall.

Further, it is possible to exclude the case where the actual output is momentarily, not continuously, in a state of being lower than the set output.

When it is determined in step S162 that the predetermined time has not passed since the actual output changed to the state of being lower than the set output (No in step S162), the processing of step S160 is executed again.

On the other hand, when it is determined in step S162 that the predetermined time has passed since the actual output changed to the state of being lower than the set output (Yes in step S162), the control unit 110 calculates the angle of attack based on the inputted measurement information and the data stored in the control database 120 (step S163).

Here, the angle of attack is calculated with respect to blade elements at respective positions in the blade span direction where respective airflow generation devices 60 are provided. For example, when five airflow generation devices 60 are provided independently in the blade span direction of the leading edges of the blades 42, the angle of attack is calculated with respect to blade elements at five positions in the blade span direction where the respective airflow generation devices 60 are provided. Note that one airflow generation device 60 has a predetermined width in the blade span direction. Accordingly, as the angle of attack, for example, it is preferred to use the average value of angles of attack in the blade span direction in the blade portion where one airflow generation device 60 is provided as the angle of attack of the portion where this one airflow generation device 60 is provided. Note that the blade element means a cross-section of a blade 42 which is perpendicular to the blade span direction of the blade 42.

Subsequently, the control unit 110 reads from the data stored in the control database 120 the angle of attack in each blade leading edge set in advance at the wind velocity and the rotation speed of the blades 42 when this angle of attack is calculated, and compares it with the calculated angle of attack. Then the control unit 110 determines whether the calculated angle of attack is larger than the set angle of attack or not (step S164). As the angle of attack in each blade leading edge set in advance, for example, an angle above which a stall occurs (stall angle of attack) is used which is determined based on leading edge shape, airfoil, chord length, Reynolds number, and so on.

Here, as described above, since the angle of attack is calculated with respect to each blade element of the portions where the respective airflow generation devices 60 are provided, the angle of attack corresponding to each blade element thereof is used as the set angle of attack. That is, the determination in step S164 is performed for each blade element. Thus, there exist a blade element for which the calculated angle of attack is determined to be larger than the set angle of attack and a blade element for which the calculated angle of attack is determined to be equal to or smaller than the set angle of attack.

When it is determined in step S164 that the calculated angle of attack is equal to or smaller than the set angle of attack (No in step S164), the processing from step S160 is repeated again for the blade element thereof.

On the other hand, when it is determined in step S164 that the calculated angle of attack is larger than the set angle of attack (Yes in step S164), the control unit 110 actuates the discharge power supply 65 for this blade element to apply a pulse modulation controlled voltage between the first electrode 61 and the second electrode 62 of the airflow generation device 60, thereby generating plasma induced flow (step S165). That is, only the airflow generation device 60 is actuated selectively which is disposed in the portion of the blade element for which it is determined that the calculated angle of attack is larger than the set angle of attack.

Note that at this time the control unit 110 sets the pulse modulation frequency f of each airflow generation device so as to satisfy the above-described relational expression (1).

Subsequently, the control unit 110 calculates an actual output functioning as a second actual output and an axial wind velocity of the wind power generation system 10 in a state that the airflow generation device 60 is actuated, based on measurement information such as the wind velocity and the wind direction measured by the wind velocity sensor 100 and the wind direction sensor 101, the rotation speed inputted from the rotation speed sensor 102, and the data stored in the control database 120 (step S166). Note that as the actual output, a measurement value of the output of the generator may be used.

Note that the angle of attack is calculated for each blade element of the portions where the respective airflow generation devices 60 are provided, but the output of the wind power generation system 10 is one value obtained as the entire wind power generation system 10.

Subsequently, the control unit 110 reads from the data stored in the control database 120 a set output which is set in advance, functioning as a second set output of the wind power generation system 10, at the axial wind velocity when this actual output (second actual output) is obtained, and compares it with the actual output (second actual output). Then, the control unit 110 determines whether the actual output (second actual output) is lower than the set output (second set output) or not (step S167).

Here, the actual output (second actual output) being lower than the set output (second set output) refers to that, similarly to the above-described case, the actual output (second actual output) is lower than the set output (second set output) by, for example, 80%. Note that the control unit 110 may determine whether or not the actual output (second actual output) has reached, for example, 80% or more of the set output (second set output) instead of determining whether or not the actual output (second actual output) is lower than the set output (second set output).

When it is determined in step S167 that the actual output (second actual output) is lower than the set output (second set output) (Yes in step S167), the processing from step S165 is executed again. That is, the state that only the airflow generation device 60 which is disposed in the portion of the blade element for which it is determined that the calculated angle of attack is larger than the set angle of attack is actuated selectively is maintained.

On the other hand, when it is determined in step S167 that the actual output (second actual output) is not lower than the set output (second set output) (No in step S167), the control unit 110 stops the actuation of the discharge power supply 65 to stop the application of voltage between the first electrode 61 and the second electrode 62 of the airflow generation device 60 (step S168). That is, the actuation of the airflow generation device 60 disposed in the portion of the blade element for which it is determined that the calculated angle of attack is larger than the set angle of attack is stopped.

Here, even when the airflow generation device 60 is stopped after the actual output (second actual output) has proceeded to the state of being not lower than the set output (second set output), this state can be maintained. Thus, the actual output (second actual output) will not proceed again to the state of being lower than the set output (second set output). This suppresses the energy consumed in the airflow generation device 60 to the minimum.

In the above-described operation of the wind power generation system 10 (control example 2), it is possible to selectively independently control, depending on conditions, each of the plurality of airflow generation devices 60 provided. By operating the wind power generation system 10 in this manner, even when the flow separates in a downstream portion of the leading edges of the blades 42, and the above-described complete stall state at the point B illustrated in FIG. 1 occurs, it is possible to reliably proceed to the regular state along the power curve (for example at the point C of FIG. 1).

OTHER CONTROL EXAMPLES

Figure 18:
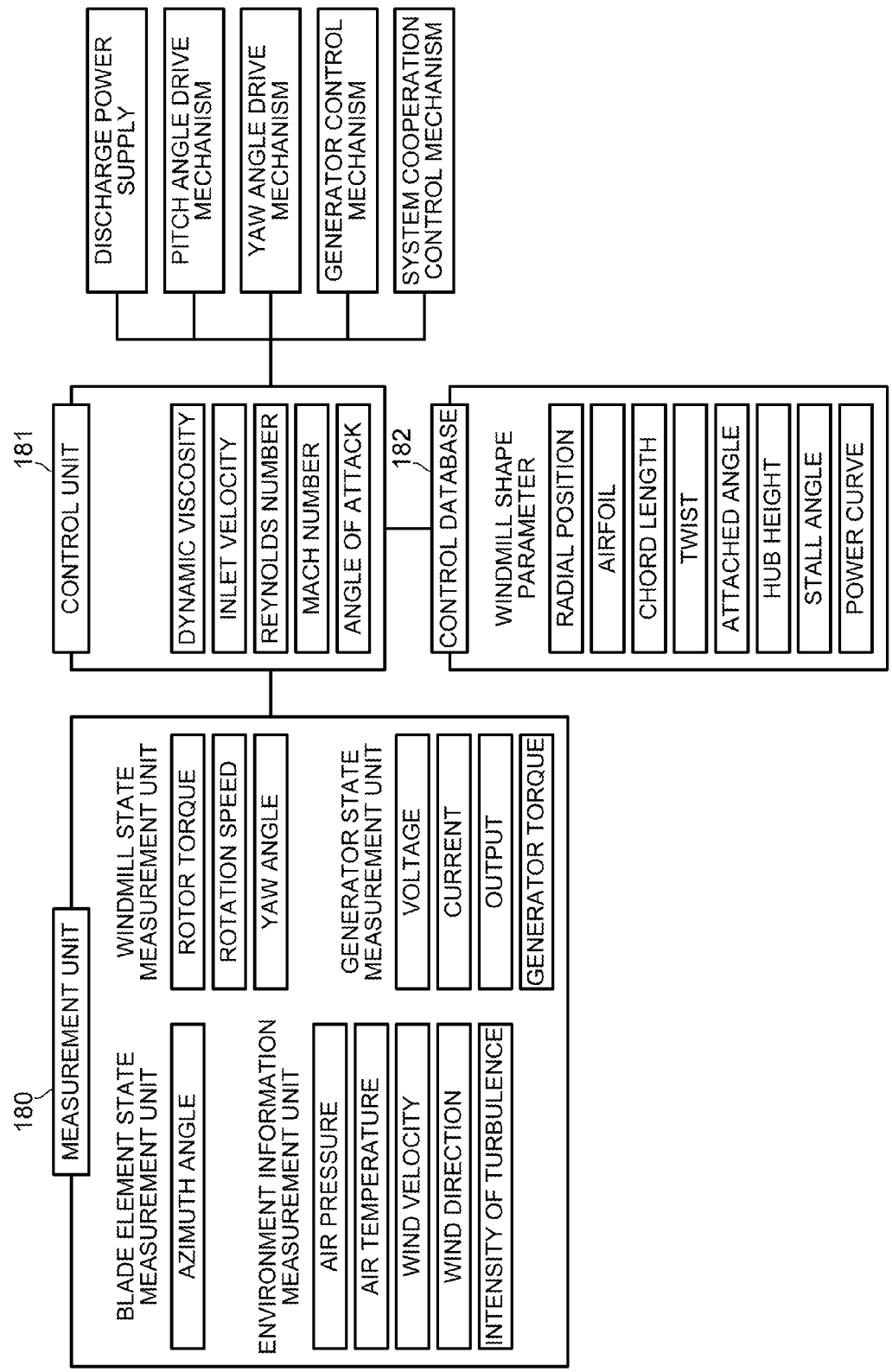
FIG. 18 is a diagram schematically illustrating another control structure in a wind power generation system of the embodiment.

FIG. 18 is a diagram schematically illustrating another control structure in the wind power generation system 10 of the embodiment. As illustrated in FIG. 18, the control structure is formed of a measurement unit 180, a control unit 181, and a control database 182.

The measurement unit 180 includes a blade element state measurement unit, an environment information measurement unit, a windmill state measurement unit, and a generator state measurement unit. The blade element state measurement unit measures an azimuth angle of a target blade element. The environment information measurement unit measures air pressure, air temperature, wind velocity, wind direction, and intensity of turbulence. The windmill state measurement unit measures rotor torque, rotation speed, and yaw angle. The generator state measurement unit measures voltage, current, output, and generator torque.

The control database 182 stores parameters of windmill shape such as radial position of each target blade element, airfoil, chord length, twist, set angle of a blade, hub height, and stall angle (including stall angle of attack) of each airfoil.

The control unit 181 calculates various types of physical quantities such as dynamic viscosity, inlet velocity, Reynolds number, Mach number, and angle of attack using the above-described measurement information and parameters. Then the control unit 181 outputs control signals controlling a discharge power supply, a pitch angle drive mechanism, a yaw angle drive mechanism, a generator control mechanism, and a system cooperation control mechanism based on the calculated results.

Here, the discharge power supply and the pitch angle drive mechanism have the same functions as the above-described discharge power supply 65 and pitch angle drive mechanism 130. Further, the control unit 181 has the same structure as the above-described control unit 110. The yaw angle drive mechanism controls a yaw drive motor based on a control signal from the measurement unit 180 to set a swing angle in a horizontal direction of the nacelle 31 relative to the tower 30. The generator control mechanism adjusts a winding current of the generator by adjusting set values of an inverter and a converter connected thereto based on a control signal from the measurement unit 180, or the like, so as to control torque of the generator. The system cooperation control mechanism controls the voltage at terminals connected to a system outside the station based on a control signal from the measurement unit 180, to thereby control a conducted electricity amount to the system.

As a control example using this control structure, a procedure of determining a current angle of attack and an angle above which a stall occurs (stall angle of attack) of a predetermined blade element and controlling the discharge power supply based on comparison results thereof will be described below.

First, the control unit 181 calculates the altitude of a blade element based on the radial position and the measurement value of azimuth angle of the blade element and information of hub height, and calculates the wind velocity and wind direction of natural wind at the blade element position using measurement values of wind velocity and wind direction and a measurement value of yaw angle together.

The control unit 181 calculates the wind velocity and wind direction of relative wind due to rotation from the radial position of the blade element and rotation speed. The control unit 181 calculates the inlet velocity and angle of attack of the relative wind at this moment with respect to the blade element using the wind velocity and wind direction together with the information of attachment angle and twist of the blade.

Further, the control unit 181 calculates a dynamic viscosity from measurement information of air temperature and air pressure, and calculates a Reynolds number and a Mach number from the chord length of the blade element and the calculated inlet velocity of the relative wind with respect to the blade element. The control unit 181 refers to the angle of attack above which a stall occurs on this blade element based on the numbers (calculated the Reynolds number and the Mach number), a measurement value of intensity of turbulence and the information of airfoil of the blade element, and employs the angle of attack as a set angle of attack.

The control unit 181 compares the calculated angle of attack with the set angle of attack, and when it is determined that the calculated angle of attack is larger than the set angle of attack, the control unit determines that separation has occurred on the blade surface, and then operates the discharge power supply so as to cause discharge on this blade element. At this time, the pulse modulation frequency f of the discharge power supply is set so that fC/U is in a predetermined range as will be described later, where U is the above-described inlet velocity and C is chord length.

By thus using this control structure, presence or absence of separation on each blade element is determined without providing a sensor detecting separation on a blade surface, and thereby it is possible to control driving of the discharge power supply. Thus, improvement in reliability of the system and cost reduction of the system can be achieved.

(Control Based on a Rotation Speed)

Figure 19:
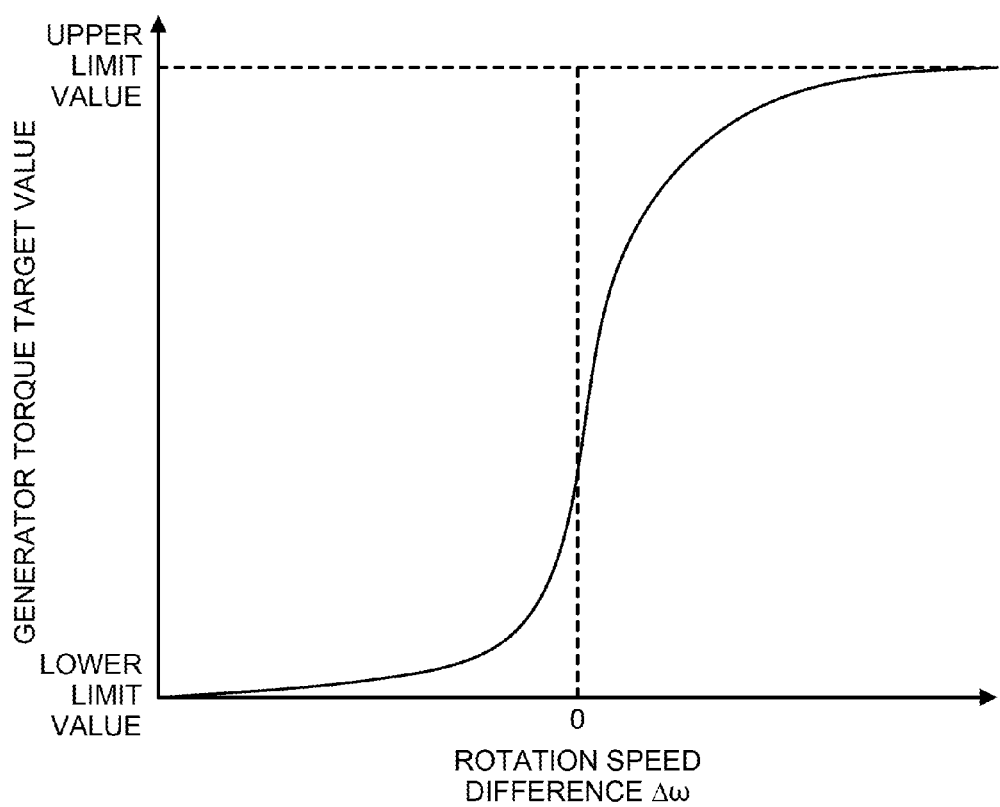
FIG. 19 is a diagram illustrating the relation between a generator torque target value and a difference between a target rotation speed and a current rotation speed.

As another control example using the above-described control structure, an example of a control method of an airflow generation device using a measurement value of a rotation speed will be presented. FIG. 19 is a diagram illustrating the relation between a generator torque target value and a difference between a target rotation speed and a current rotation speed.

First, an example of control of a generator by peripheral velocity ratio constant control will be presented. The peripheral velocity ratio constant control refers to controlling generator torque so that the generator operates constantly at a design peripheral velocity ratio as described above even when there are variations in wind velocity and wind direction in the partial load region.

The control unit 181 calculates the rotation speed for achieving a target peripheral velocity ratio from an average value of wind velocity in a predetermined time interval, and takes the calculated rotation speed as the target rotation speed.

Subsequently, the control unit 181 sets a control curve with the generator torque target value being the vertical axis and a rotation speed difference ($\Delta\omega$) obtained by subtracting the target rotation speed from the current rotation speed being the horizontal axis, as illustrated in FIG. 19. Here, setting to the generator torque target value on the vertical axis is performed according to the rotation speed difference ($\Delta\omega$).

The control curve illustrated in FIG. 19 can be set based on a sigmoid function for example. One side of this control curve based on a sigmoid function is asymptotic to the upper limit value of the generator torque target value, and the other side of the control curve is asymptotic to the lower limit value of the generator torque target value.

When the current rotation speed is larger than the target rotation speed (when the rotation speed difference ($\Delta\omega$) is larger than 0), the control unit 181 performs control to increase the generator torque target value based on the control curve to decrease the current rotation speed, so as to make it close to the target rotation speed.

On the other hand, when the current rotation speed is smaller than the target rotation speed (when the rotation speed difference ($\Delta\omega$) is smaller than 0), the control unit 181 performs control to decrease the generator torque target value based on the control curve to increase the current rotation speed, so as to make it close to the target rotation speed.

Here, when the current rotation speed is equal to the target rotation speed (when the rotation speed difference ($\Delta\omega$) is 0), the generator torque target value corresponds to the logical value of the rotor torque at the target rotation speed.

As described above, the control unit 181 calculates the generator torque target value from measurement values of the wind velocity and the current rotation speed, and controls the generator or load so that this generator torque target value occurs.

When performing such control of the generator, the control unit 181 actuates the discharge power supply (ON) when the current rotation speed is in a region smaller than the target rotation speed. When separation has occurred on a blade surface, the separation is suppressed, the lift of the blade element increases, the rotor torque increases, and it is possible to reach the target rotation speed earlier. Further, the control unit 181 does not actuate the discharge power supply (OFF) when the current rotation speed is larger than the target rotation speed. Thus, the rotor torque decreases, and it is possible to reach the target rotation speed earlier.

Here, actuating the discharge power supply means generating plasma induced flow by continuous or pulse modulation control in the airflow generation device 60, and not actuating the discharge power supply means not generating plasma induced flow either in continuous or pulse modulation control in the airflow generation device 60.

(Control Based on Rotor Torque)

Next, as another control example using the above-described control structure, an example of control of the airflow generation device using measurement values of the rotor torque will be presented. Here, the rotor torque may be measured by using a torque meter, or a value calculated from the above-described expression (2) may be used.

The control unit 181 calculates the rotor torque using measurement values of the rotation speed and the generator torque. Here, the generator torque may be measured by using a torque meter, or a value calculated from the above-described expression (3) may be used. Note that an output P may be measured using a power meter, or a product of measurement values of voltage and current may be used.

Here, operation of the discharge power supply, which will be described later, combines both functions of operation for detecting a separation state and flow control operation.

Figure 20A:
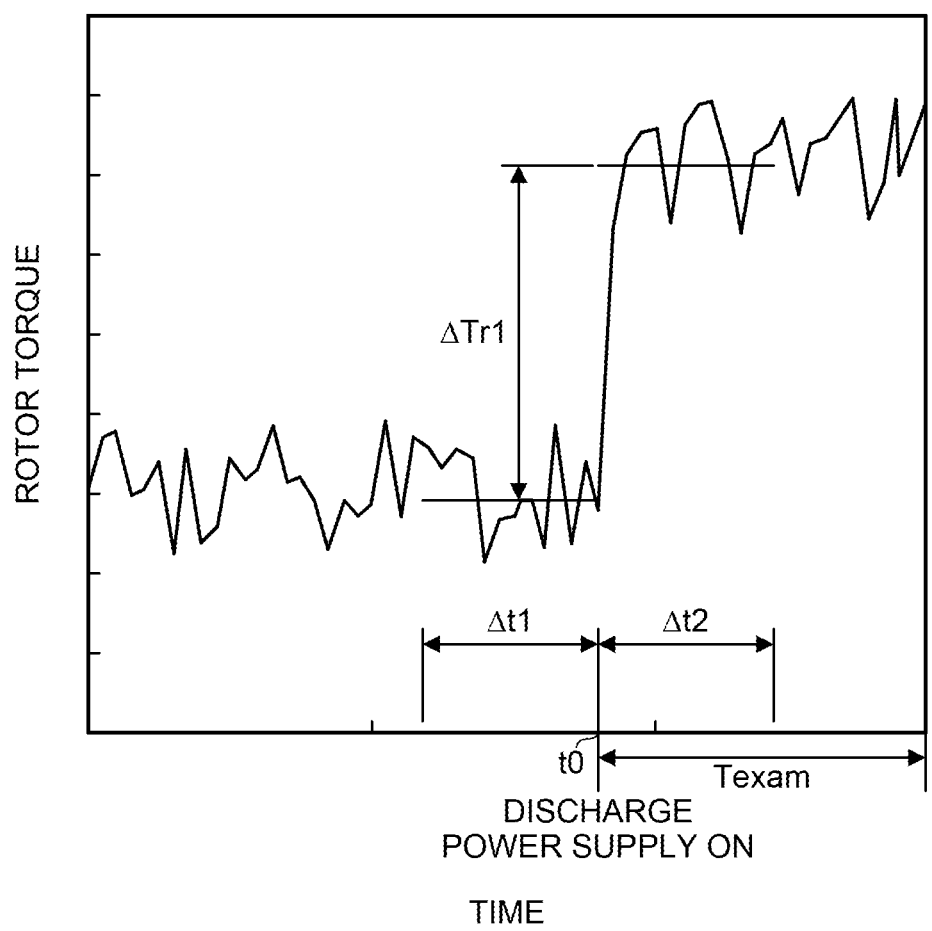
FIG. 20A is a diagram illustrating a time variation of rotor torque during operation for detecting a flow separation state.
Figure 20B:
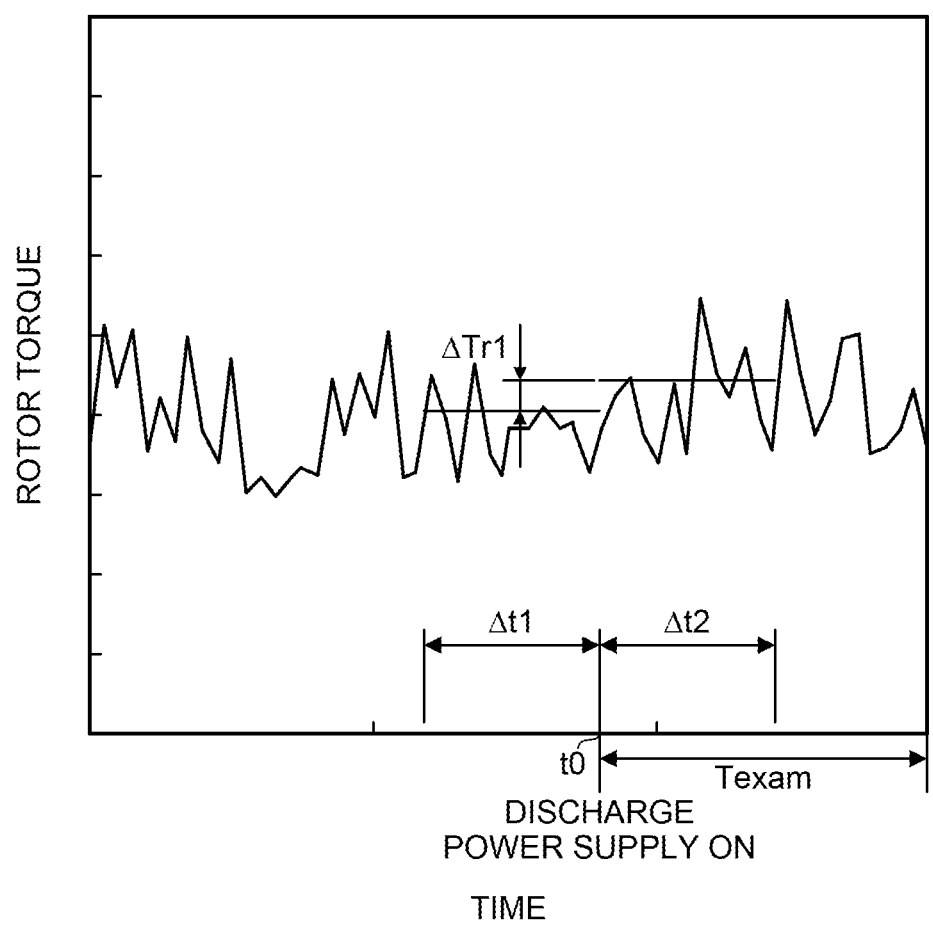
FIG. 20B is a diagram illustrating a time variation of the rotor torque during the operation for detecting a flow separation state.
Figure 21:
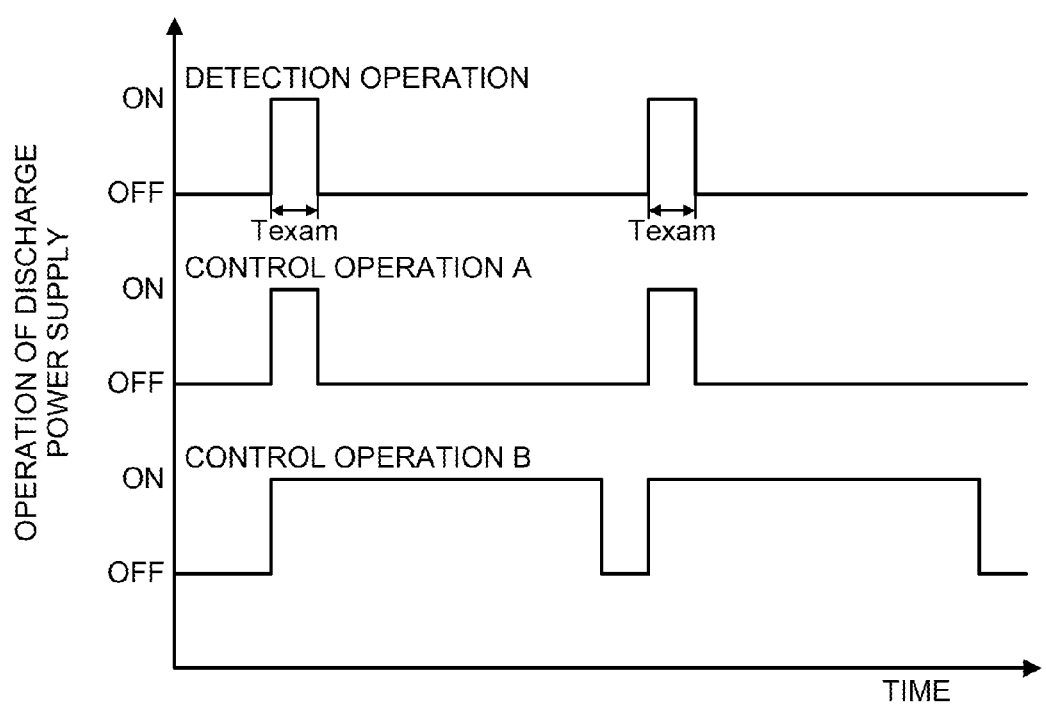
FIG. 21 is a diagram for describing operation of a discharge power supply during the detection operation and during control operation.

FIG. 20A and FIG. 20B are diagrams illustrating a time variation of the rotor torque during the operation for detecting a flow separation state in this control example. FIG. 21 is a diagram for describing operation of the discharge power supply during the detection operation and during the control operation.

First, the detection operation will be described in a state that the rotor torque is in a transition while being varied by a variation of natural wind. As illustrated in FIG. 20A and FIG. 20B, the control unit 181 actuates the discharge power supply (ON) at a time t0 for a time Texam. At this time, when flow separation has occurred on a blade surface, the lift of the blade is improved by actuating the discharge power supply, and thus the rotor torque increases. Note that when the rotor torque does not increase, the flow separation on the blade surface has not occurred.

Accordingly, as illustrated in FIG. 20A and FIG. 20B, the control unit 181 calculates respective average values of the rotor torque during a time $\Delta t_i$ before the timing (time t0) of actuating the discharge power supply and during a time $\Delta t_2$ after the timing of actuating the discharge power supply. Then the control unit 181 compares the average values of the rotor torque during the time $\Delta t_1$ and the time $\Delta t_2$.

When a difference ($\Delta Tr1$) in the average values of the rotor torque is equal to or larger than a predetermined threshold (FIG. 20A), the effect by actuating the discharge power supply is obtained. That is, as illustrated in FIG. 20A, when the difference ($\Delta Tr1$) in the average values of the rotor torque is equal to or larger than the predetermined threshold, it is determined that flow separation has occurred before the discharge power supply is actuated.

On the other hand, when the difference ($\Delta Tr1$) in the average values of the rotor torque is not larger than the predetermined threshold (FIG. 20B), it is determined as a state that the effect by actuating the discharge power supply is not obtained, that is, a state that flow separation has not occurred before the discharge power supply is actuated. Note that the state that the discharge power supply is actuated during the time Texam is a state that the detection operation is ON in FIG. 21.

When it is determined that flow separation has occurred based on the difference ($\Delta Tr1$) in the average values of the rotor torque, the control unit 181 actuates the discharge power supply continuously for a predetermined time also after the detection operation, as illustrated by control operation B in FIG. 21. Then, after a predetermined time passes, the control unit 181 actuates the discharge power supply during the time Texam and performs the detection operation again.

On the other hand, when it is determined that flow separation has not occurred based on the difference ($\Delta Tr1$) in the average values of the rotor torque, the control unit 181 does not actuate the discharge power supply for a predetermined time as illustrated by control operation A in FIG. 21. Then, the control unit 181 actuates, after a predetermined time passes, the discharge power supply during the time Texam, and performs the detection operation again.

Thus, by detecting a time variation of the rotor torque during the detection operation, the presence or absence of flow separation can be detected. Further, by actuating the airflow generation device 60 based on this detection result, flow can be controlled to cause flow separation to disappear.

Figure 22A:
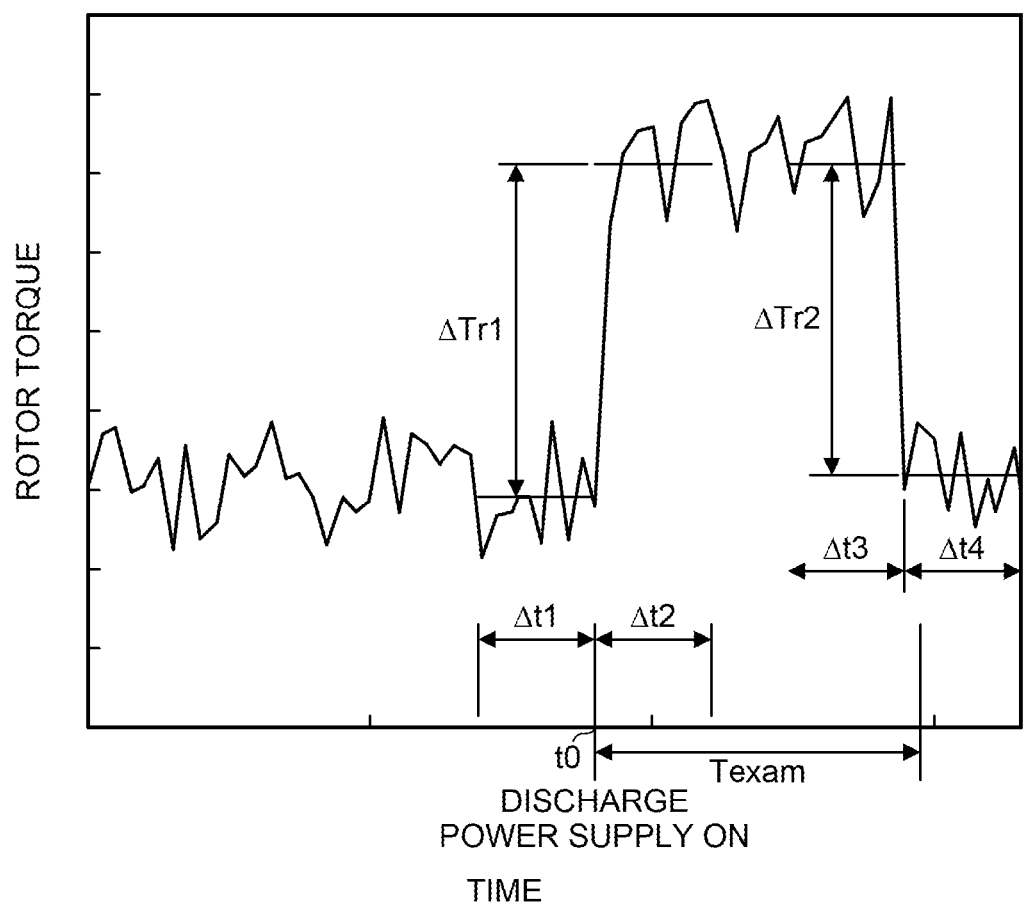
FIG. 22A is a diagram illustrating a time variation of the rotor torque during and after the detection operation.
Figure 22B:
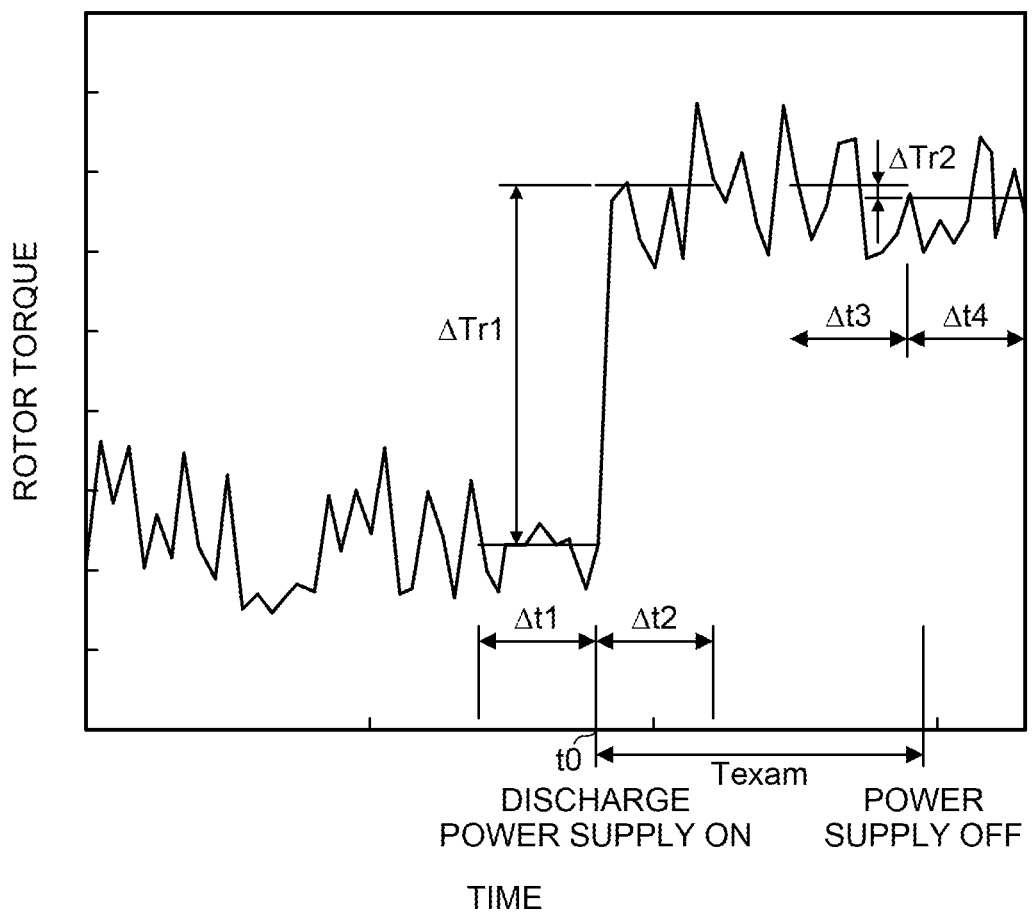
FIG. 22B is a diagram illustrating a time variation of the rotor torque during and after the detection operation.
Figure 23:
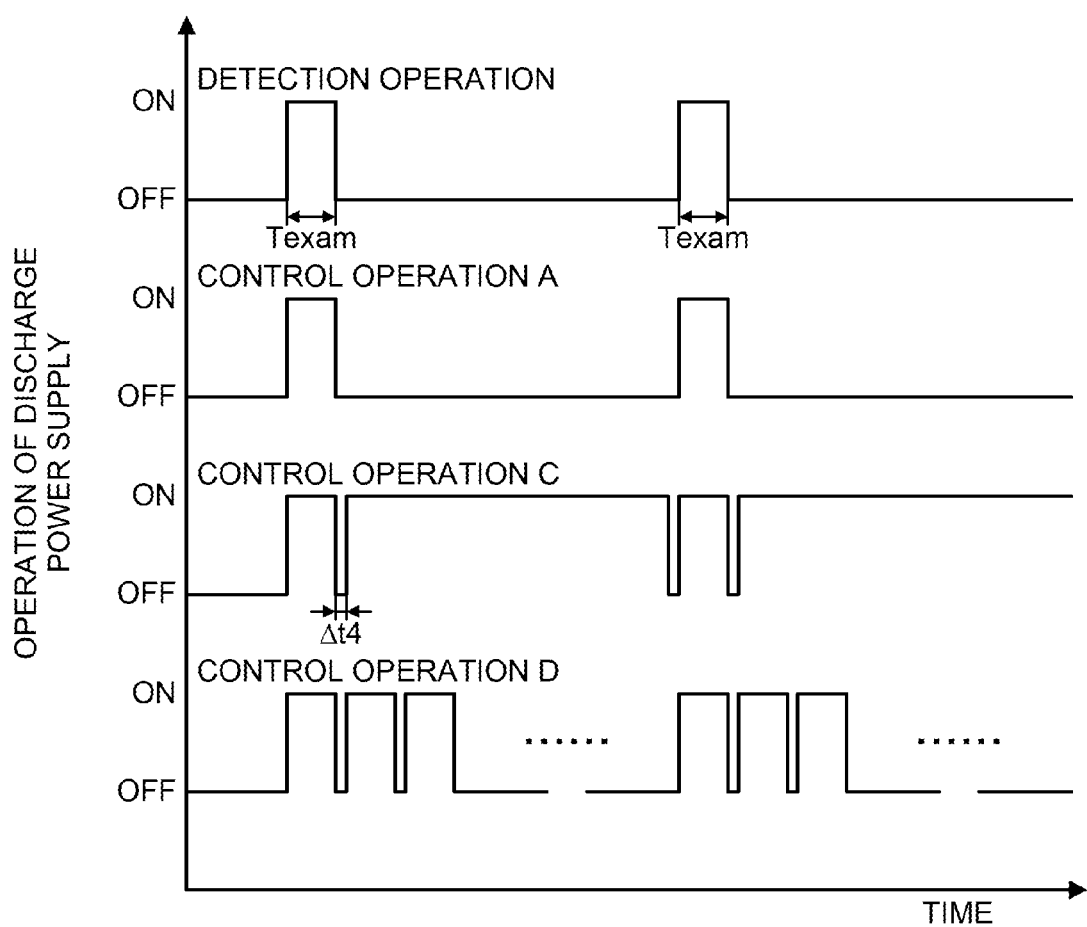
FIG. 23 is a diagram for describing operation of the discharge power supply during the detection operation and during the control operation.

Next, a control example will be described including operation for determining whether it is a state that flow still separates or a state that flow attaches after a flow separation state is detected by the detection control. FIG. 22A and FIG. 22B are diagrams illustrating a time variation of the rotor torque during and after the detection operation in this control example. FIG. 23 is a diagram for describing operation of the discharge power supply during the detection operation and during the control operation.

Here, operation when it is determined in the detection operation that flow separation has occurred will be described.

However, in FIG. 23, control operation A when it is determined in the detection operation that flow separation has not occurred is also illustrated.

When it is determined that flow separation has occurred based on the difference ($\Delta$Tr1) in the average values of the rotor torque, the control unit 181 stops the operation of the discharge power supply once after actuating the discharge power supply during the time Texam as illustrated by control operation C in FIG. 23.

Here, when flow separation has occurred on a blade surface, the lift of the blade decreases and the rotor torque decreases by stopping the discharge power supply. Note that when the rotor torque does not decrease, the flow separation on the blade surface has disappeared.

Accordingly, the control unit 181 calculates respective average values of the rotor torque during a time $\Delta$t3 before the discharge power supply is stopped (after Texam from the time t0) and during a time $\Delta$t4 after the discharge power supply is stopped, as illustrated in FIG. 22A and FIG. 22B. Then, the control unit 181 compares the average values of the rotor torque during the time $\Delta$t3 and the time $\Delta$t4.

When a difference ($\Delta$Tr2) in the average values of the rotor torque is equal to or larger than a predetermined threshold (FIG. 22A), it is determined that flow separation has occurred.

On the other hand, when the difference ($\Delta$Tr2) in the average values of the rotor torque is not larger than the predetermined threshold (FIG. 22B), it is determined that the flow is attached to the blade surface and the flow separation has disappeared.

When it is determined that flow separation has occurred based on the difference ($\Delta$Tr2) in the average values of the rotor torque, the control unit 181 actuates the discharge power supply for a predetermined time as illustrated by the control operation C in FIG. 23. Then, after the predetermined time passes, the control unit stops the discharge power supply, and thereafter actuates the discharge power supply during the time Texam and performs the detection operation again.

Note that when the difference ($\Delta$Tr2) in the average values of the rotor torque is equal to or larger than the predetermined threshold, the control unit 181 may actuate the discharge power supply so as to perform the detection operation repeatedly as illustrated by control operation D of FIG. 23. In this case, for example, the above-described difference ($\Delta$Tr2) in the average values of the rotor torque may be detected for every time of the detection operation, so as to detect the presence or absence of flow separation. Further, the difference ($\Delta$Tr2) in the average values of the rotor torque may be detected after the detection operation is performed a predetermined number of times, so as to detect the presence or absence of flow separation.

By detecting a time variation of the rotor torque during the detection operation in this manner, the presence or absence of flow separation before and after the detection operation can be detected. Moreover, since the presence or absence of flow separation after the detection operation can be detected, the discharge power supply, that is, the airflow generation device 60 can be operated effectively only when flow separation occurs after the detection operation. Then, by actuating the airflow generation device 60, flow can be controlled to cause flow separation to disappear.

Here, when a plurality of airflow generation devices 60 are provided on a blade, both the detection operation and the control operation may be performed in a predetermined airflow generation device 60. Further, an airflow generation device 60 which performs the detection operation and an airflow generation device 60 which performs the control operation may be different ones. Reduction in power consumption can be achieved by reducing the number of airflow generation devices 60 which perform the detection operation.

Note that in the above-described control examples, although the rotor torque is used as the measurement value for the case where a separation state is detected by the detection operation, similar control is possible by using an output or a rotation speed as the measurement value.

(The Influence of a Voltage Applied to the Airflow Generation Devices 60)

(1) The Relation Between a Lift Coefficient C and an Angle of Attack $\alpha$

Figure 9:
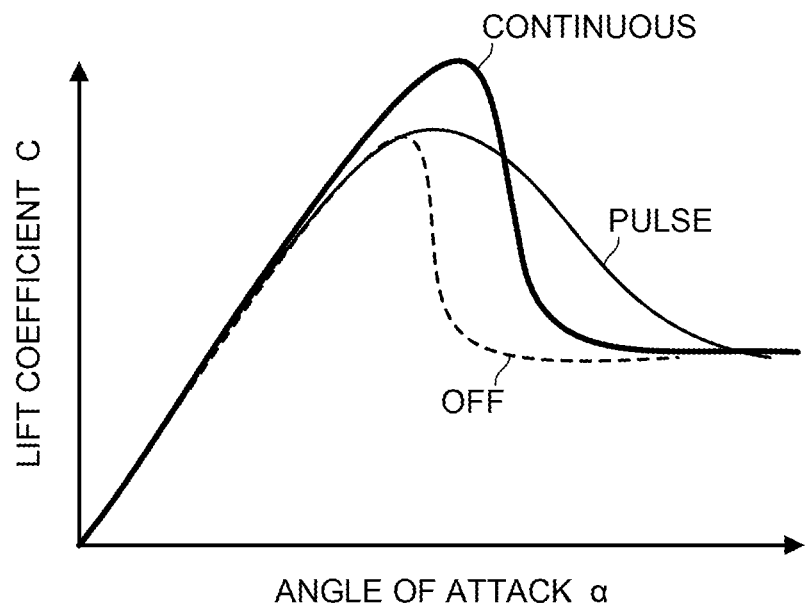
FIG. 9 is a diagram illustrating the relation between a lift coefficient C and an angle of attack α of a single blade of leading edge separation type.

FIG. 9 is a diagram illustrating the relation between a lift coefficient C and an angle of attack $\alpha$ of a single blade of leading edge separation type. The results illustrated in FIG. 9 are obtained by a wind tunnel experiment of a two-dimensional blade.

Here, in a leading edge of a single blade, the airflow generation device 60 is provided similarly to the structure illustrated in FIG. 4. FIG. 9 illustrates the case where the airflow generation device 60 is not actuated when it stalls (OFF), the case where the pulse modulation controlled voltage is applied between the first electrode 61 and the second electrode 62 of the airflow generation device 60 when it stalls (pulse), and the case where a voltage is applied continuously without performing pulse modulation control between the first electrode 61 and the second electrode 62 of the airflow generation device 60 when it stalls (continuous).

In a lift characteristic of the blade of leading edge separation type, a stall phenomenon occurs such that the lift coefficient C decreases largely when the angle of attack $\alpha$ exceeds a threshold. On the blade surface of the suction side (negative pressure side) of the blade in which the stall phenomenon occurred, large-scale separation occurs, details of which will be described later.

When the airflow generation device 60 is actuated, the angle of attack $\alpha$ with which the stall occurs becomes large either of the continuous case and the pulse case. However, the angle of attack $\alpha$ relative to the lift coefficient C differs in the continuous case and the pulse case. In the continuous case, the angle of attack $\alpha$ with which the stall occurs becomes large, and the maximum lift coefficient C increases. However, when the angle of attack $\alpha$ is increased further, the stall occurs sooner or later, and the lift coefficient C drops rapidly.

On the other hand, in the pulse case, in the region on a larger side than the angle of attack $\alpha$ to stall in the OFF case, the decrease ratio of the lift coefficient C accompanying increase of the angle of attack $\alpha$ is smaller than the decrease ratio of the lift coefficient C accompanying increase of the angle of attack $\alpha$ in the OFF case. That is, it can be seen that the decrease ratio of the lift coefficient C is small.

Figure 10:
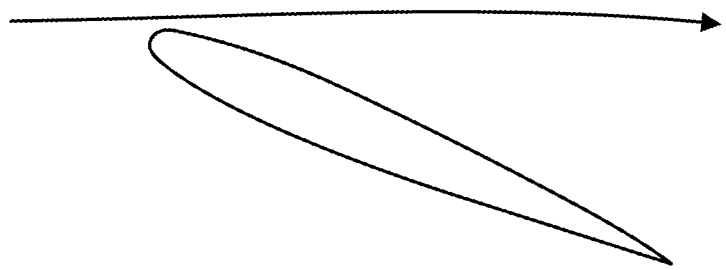
FIG. 10 is a diagram schematically illustrating flow along the blade in the case where airflow generation devices are not actuated (OFF) when the flow stalls on the leading edge of the blade.
Figure 12:
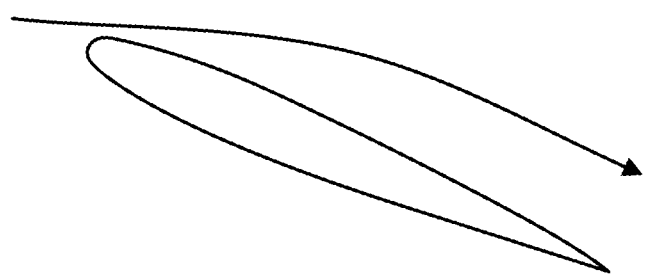
FIG. 12 is a diagram schematically illustrating flow along the blade in the case where a pulse modulation controlled voltage is applied to the airflow generation devices (pulse) when the flow stalls on the leading edge of the blade.

FIG. 10 is a diagram schematically illustrating flow along the blade in the case where the airflow generation devices 60 are not actuated (OFF) when the flow stalls on the leading edge of the blade. FIG. II is a diagram schematically illustrating flow along the blade in the case where a voltage is applied continuously to the airflow generation devices 60 (continuous) when the flow stalls on the leading edge of the blade. FIG. 12 is a diagram schematically illustrating flow along the blade in the case where a pulse modulation controlled voltage is applied to the airflow generation devices 60 (pulse) when the flow stalls on the leading edge of the blade.

Figure 11:
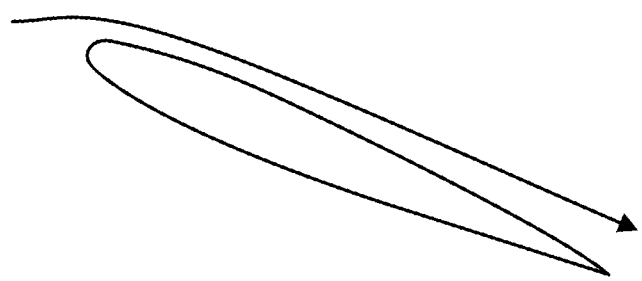
FIG. 11 is a diagram schematically illustrating flow along the blade in the case where a voltage is applied continuously to the airflow generation devices (continuous) when the flow stalls on the leading edge of the blade.

The flow illustrated in FIG. 10 to FIG. 12 is a result of measurement using PIV (Particle Image Velocimetry).

In the OFF case, it can be seen that large scale separation occurs on the suction side (negative pressure side) in a downstream portion of the leading edge of the blade. In the continuous case, as illustrated in FIG. 11, it can be seen that the flow completely attaches. In the pulse case, as illustrated in FIG. 12, although it is not complete attachment, it can be seen that there is an effect of drawing the flow. Thus, it can be seen that there occurs a phenomenon that the flow control effect differs largely between the continuous case and the pulse case.

(2) Verification by an Actual Machine

Here, the airflow generation devices 60 were disposed on the blades of a small windmill as an actual machine, a wind tunnel experiment was performed, and the influence of the voltage applied to the airflow generation devices 60 was examined.

As the wind tunnel, a blowdown tunnel having a rated airflow rate of 1200 m$^3$/min and a rated pressure of 11.8 kPa was used. A vena contracta was formed at the exit of the wind tunnel, allowing ventilation up to the velocity of 10 m/s.

As the small windmill, a small windmill model obtained by modifying a commercially available small windmill was used. As the small windmill, a windmill having three wooden blades and having a windmill diameter of 1.6 m, corresponding to the exit size of the wind tunnel, and an output of 300 W was employed. The small windmill was disposed at a position of 770 mm from the exit of the wind tunnel with a yaw angle of 0 degree. Regarding the rating of this windmill, a power generation amount is 300 W at the wind velocity of 12.5 m/s. Note that the main flow velocity was measured using a pilot tube and a thermocouple.

The airflow generation devices 60 were provided one each in the blade span direction in the respective leading edges of the blades. At this time, as illustrated in FIG. 4, the first electrode 61 were disposed so that an edge of the first electrode 61 on the second electrode 62 side is on the leading edge of the blade, and the second electrode 62 were disposed at a position on a suction side 42a of the blade relative to the first electrode 61. The first electrode 61 having a length of 610 mm is disposed on a polyimide resin having a thickness of 250 μm which is a dielectric. The second electrode 62 is disposed in the polyimide resin so that plasma induced flow occurs toward the suction side of the blade.

On a rotation shaft between a hub and a generator, the discharge power supply 65 and a slip ring were disposed. An encoder for measuring the rotation speed was disposed. An input of 0 to 100 VAC and a modulation signal of 5 VDC were inputted to the discharge power supply 65 from the outside via the slip ring. A high-voltage output from a power supply transformer was wired in a nose cone using cables 64 for high voltage withstanding 20 kV. High voltage amplitude in the discharge power supply 65 was adjusted by varying the input voltage with a variable autotransformer.

When pulse modulation control is performed, the duty ratio during pulse modulation was fixed to 10%, and the pulse modulation frequency f was varied in the range of 1 Hz to 900 Hz.

An Erema resistor R was connected as a load to both ends of wires lead out to the outside via a tower shaft of the windmill, and the power generator output was evaluated by a both-end voltage of this resistor.

In the experiment, first, the wind velocity was increased from a state that the windmill is rotating at low speed, and the increase ratio of axial wind velocity was adjusted so as to cause the complete stall state at the above-described point B illustrated in FIG. 1. In this complete stall state, the airflow generation devices 60 were actuated. Test results are illustrated in FIG. 13 to FIG. 16.

Figure 13:
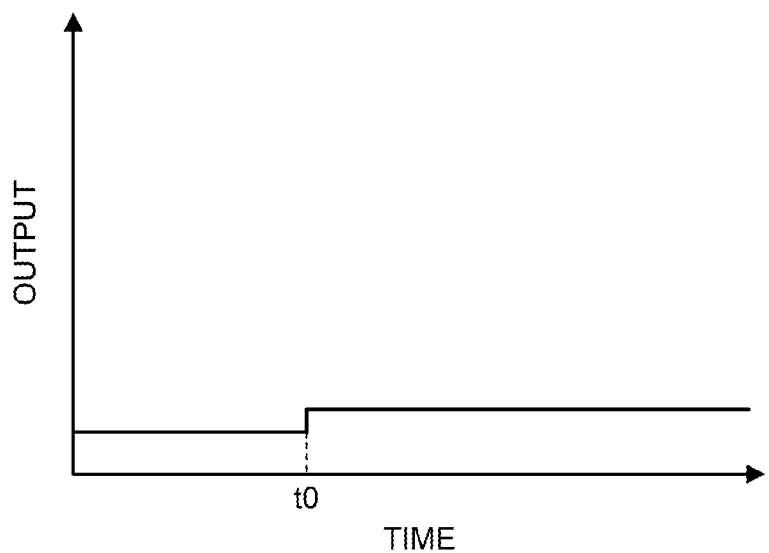
FIG. 13 is a diagram illustrating the relation between an output and a time in the case where a voltage is applied continuously to the airflow generation devices (continuous).
Figure 14:
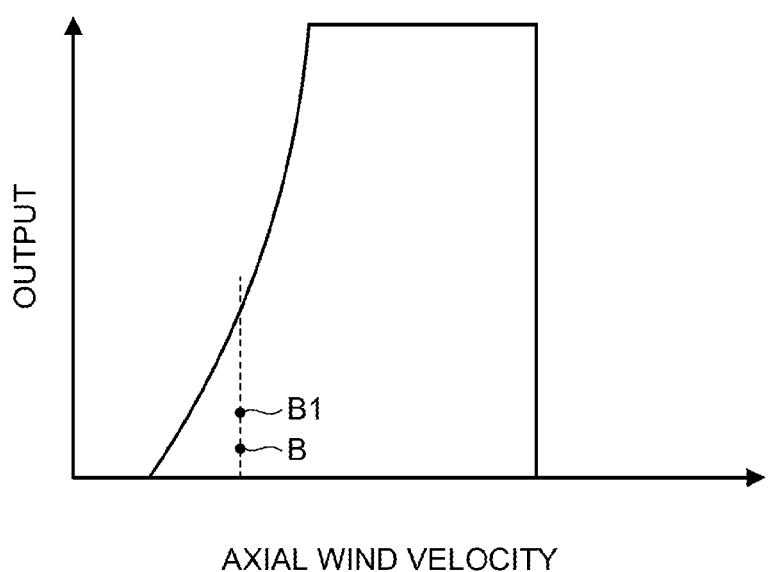
FIG. 14 is a diagram illustrating the relation between an output and an axial wind velocity in the case where a voltage is applied continuously to the airflow generation devices (continuous).
Figure 15:
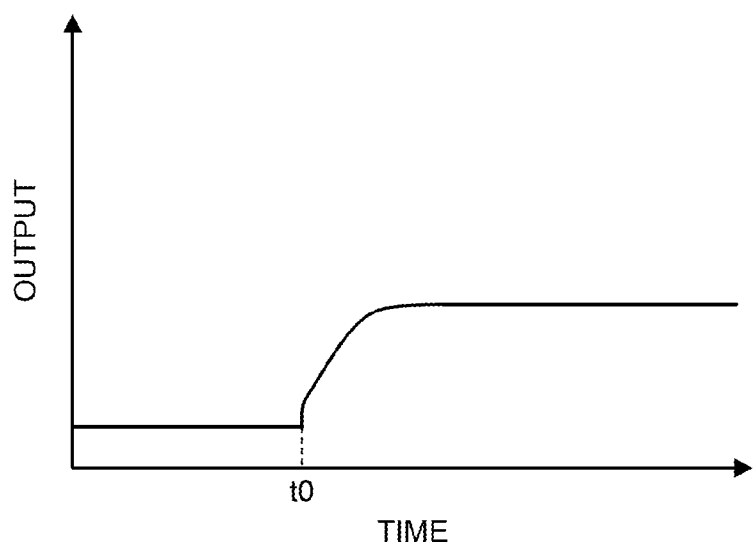
FIG. 15 is a diagram illustrating the relation between an output and a time in the case where a pulse modulation controlled voltage is applied to the airflow generation devices (pulse).
Figure 16:
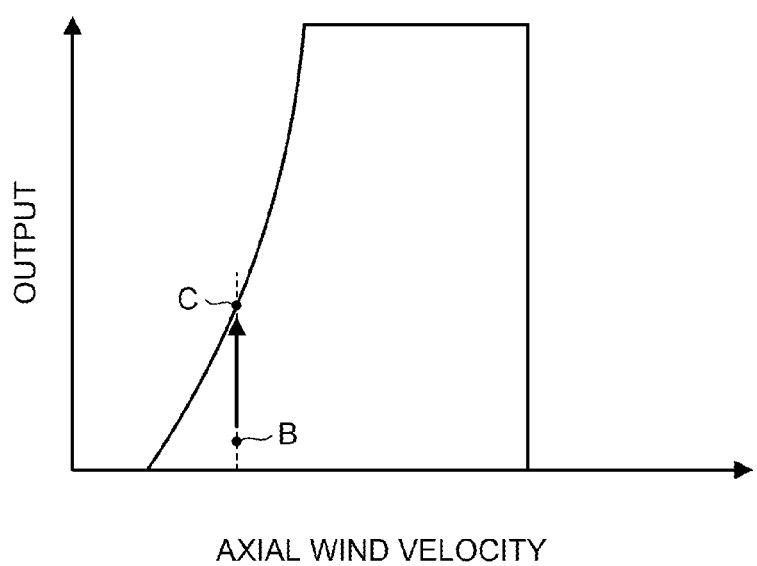
FIG. 16 is a diagram illustrating the relation between an output and an axial wind velocity in the case where a pulse modulation controlled voltage is applied to the airflow generation devices (pulse).

FIG. 13 is a diagram illustrating the relation between an output and a time in the case where a voltage is applied continuously to the airflow generation devices 60 (continuous). FIG. 14 is a diagram illustrating the relation between an output and an axial wind velocity in the case where a voltage is applied continuously to the airflow generation devices 60 (continuous). FIG. 15 is a diagram illustrating the relation between an output and a time in the case where a pulse modulation controlled voltage is applied to the airflow generation devices 60 (pulse). FIG. 16 is a diagram illustrating the relation between an output and an axial wind velocity in the case where a pulse modulation controlled voltage is applied to the airflow generation devices 60 (pulse).

Note that t0 on the horizontal axis in FIG. 13 and FIG. 15 indicates when the airflow generation devices 60 are actuated. Further, FIG. 15 and FIG. 16 illustrate results when the pulse modulation frequency f is adjusted so that fC/U denoted in the above-described expression (1) becomes 1.

As illustrated in FIG. 13, in the continuous case, the output increased about 10% at t0. The plot of this effect on the power curve was as illustrated in FIG. 14. It proceeded from a point B of complete stall state to a point B1, but it was found that there is small improvement in output.

As illustrated in FIG. 15, in the pulse case, the output increased slightly at t0 but the output increased gradually in several minutes thereafter, increased to about eight times the original output and then saturated. The plot of this effect on the power curve is as illustrated in FIG. 16. It proceeded from the point B of completely stall state to point C on the power curve. Further, even when the airflow generation devices 60 were stopped after proceeded to the state at the point C, the state remained at the point C and did not proceed again to the point B.

Next, the pulse modulation frequency f was varied in the case where a pulse modulation controlled voltage was applied to the airflow generation devices 60 (pulse), and the relation between fC/U of the above-described expression (1) and the output was checked.

Figure 17:
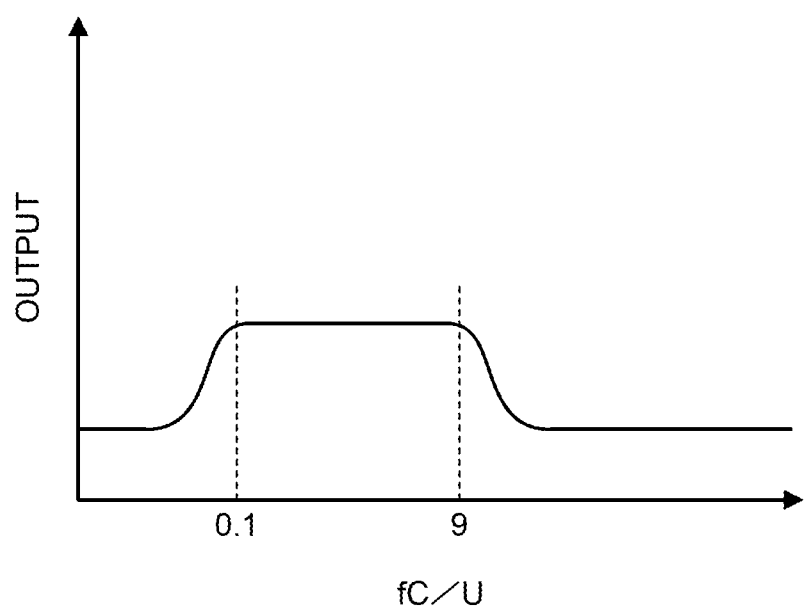
FIG. 17 is a diagram illustrating the relation between fC/U and an output in the case where a pulse modulation controlled voltage is applied to the airflow generation devices (pulse).

Also in this test, first, the wind velocity was increased from a state that the windmill was rotating at low speed, and the increase ratio of axial wind velocity was adjusted so as to cause the complete stall state at the above-described point B illustrated in FIG. 1. In this complete stall state, the airflow generation devices 60 were actuated. FIG. 17 is a diagram illustrating the relation between fC/U and an output in the case where a pulse modulation controlled voltage is applied to the airflow generation devices 60 (pulse).

As illustrated in FIG. 17, when the value of fC/U is in the range of 0.1 to 9, it is found that a phenomenon of proceeding from the point B of complete stall state to the point C on the power curve occurs, and a high output can be obtained. Further, even when the airflow generation devices 60 were stopped after proceeded to the state at the point C, the state remained at the point C and did not proceed again to the point B.

In the above-described embodiment, the flow above a blade surface can be optimized, and an output of generated electricity can be improved. In this embodiment, an example of a wind power generation system in which the pitch angles of blades are controllable is presented, but the relation of fC/U in the expression (1) holds true regardless of the presence of control of the pitch angles. Accordingly, the relation of fC/U in the expression (1) can be applied to a wind power generation system which does not have a control mechanism of the pitch angles of blades.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wind power generation system, comprising:
a rotor having a hub and at least two or more blades attached to the hub;
a nacelle pivotally supporting the rotor via a rotation shaft connected to the hub;
a tower supporting the nacelle;
an airflow generation device provided in a leading edge of each of the blades, the airflow generation device having:
a first electrode disposed along a surface of the leading edge;
a second electrode disposed along the surface of the leading edge; and
a dielectric configured to separate the first electrode and the second electrode, the first electrode and the second electrode being configured to generate plasma induced flow from the leading edge along the blade;
a voltage application mechanism configured to apply a voltage between the first electrode and the second electrode of the airflow generation device;
a storage configured to store a prescribed data related to at least one of a set output of the wind power generation system, a set torque in the rotor, or a set rotation speed of the blades;
a measurement device configured to detect a measurement data related to at least one of an actual output in the wind power generation system, an actual torque in the rotor, or an actual rotation speed of the blades; and
a control unit configured to compare the prescribed data and the measurement data so as to control the voltage application mechanism.

2. The wind power generation system according to claim 1, wherein, when the actual output in the wind power generation system, the actual torque in the rotor, or the actual rotation speed of the blades detected by the measurement device is lower for a predetermined time period than the set output in the wind power generation system, the set torque in the rotor, or the set rotation speed of the blades stored in the storage at an axial wind velocity when the actual output, the actual torque, or the actual rotation speed is detected, the control unit controls the voltage application mechanism to apply the voltage between the first electrode and the second electrode so as to generate plasma induced flow.

3. The wind power generation system according to claim 2, wherein, when the actual output in the wind power generation system, the actual torque in the rotor, or the actual rotation speed of the blades detected by the measurement device while the plasma induced flow is generated reaches for a predetermined time period the set output in the wind power generation system, the set torque in the rotor, or the set rotation speed of the blades stored in the storage at an axial wind velocity when the actual output, the actual torque, or the actual rotation speed is detected, the control unit controls the voltage application mechanism to stop applying the voltage between the first electrode and the second electrode.

4. The wind power generation system according to claim 1, wherein the control unit controls the voltage application mechanism to apply the voltage between the first electrode and the second electrode for a predetermined time period and compares the actual output in the wind power generation system, the actual torque in the rotor, or the actual rotation speed of the blades detected by the measurement device before and after applying the voltage; and
wherein, when the actual output, the actual torque, or the actual rotation speed detected by the measurement device is increased by the application of the voltage, the control unit controls the voltage application mechanism further for a predetermined time period to apply the voltage between the first electrode and the second electrode so as to generate plasma induced flow.

5. The wind power generation system according to claim 1, wherein a plurality of the airflow generation devices are provided in a blade span direction in leading edges of the blades, and the plurality of the airflow generation devices are controlled independently.

6. The wind power generation system according to claim 1, wherein, in the case where a plurality of the airflow generation devices are provided in a blade span direction in leading edges of the blades, and the plurality of the airflow generation devices are controlled independently, when the actual output in the wind power generation system, the actual torque in the rotor, or the actual rotation speed of the blades detected by the measurement device is lower for a predetermined time period than the set output in the wind power generation system, the set torque in the rotor, or the set rotation speed of the blades stored in the storage at an axial wind velocity when the actual output, the actual torque, or the actual rotation speed is detected, the control unit calculates an angle of attack in each blade leading edge where each of the airflow generation devices is provided based on a wind velocity and the actual rotation speed of the blades; and
wherein, when a calculated angle of attack is larger than an angle of attack in each blade leading edge set in advance at a wind velocity and the actual rotation speed of the blades when this angle of attack is calculated, the control unit controls the voltage application mechanism to selectively apply a voltage between the first electrode and the second electrode provided in the blade leading edge for which the calculated angle of attack is larger than the angle of attack set in advance.

7. The wind power generation system according to claim 1, wherein,
in the case where a plurality of the airflow generation devices are provided in a blade span direction in leading edges of the blades, and the plurality of the airflow generation devices are controlled independently, the control unit controls the voltage application mechanism to apply the voltage between the first electrode and the second electrode for a predetermined time period and compares the actual output in the wind power generation system, the actual torque in the rotor, or the actual rotation speed of the blades detected by the measurement device before and after applying the voltage, and when the actual output, the actual torque, or the actual rotation speed detected by the measurement device is increased by the application of the voltage, the control unit calculates an angle of attack in each blade leading edge where each of the airflow generation devices is provided based on a wind velocity and the actual rotation speed of the blades; and
wherein, when a calculated angle of attack is larger than an angle of attack in each blade leading edge set in advance at a wind velocity and the actual rotation speed of the blades when this angle of attack is calculated, the control unit controls the voltage application mechanism to selectively apply a voltage between the first electrode and the second electrode provided in the blade leading edge for which the calculated angle of attack is larger than the angle of attack set in advance.

8. The wind power generation system according to claim 1, wherein the voltage applied by the voltage application mechanism is controlled to perform pulse modulation.

9. The wind power generation system according to claim 8, wherein the value of a relational expression fC/U is 0.1 or larger and 9 or smaller where f is a pulse modulation frequency of the voltage in the pulse modulation control, C is a chord length of the blades, and U is a relative velocity combining a peripheral velocity of the blades and a wind velocity.

10. A control method for a wind power generation system including a rotor having a hub and at least two or more blades attached to the hub, a nacelle pivotally supporting the rotor via a rotation shaft connected to the hub, a tower supporting the nacelle, and an airflow generation device provided in a leading edge of each of the blades, the airflow generation device having: a first electrode disposed along a surface of the leading edge, a second electrode disposed along the surface of the leading edge, and a dielectric configured to separate the first electrode and the second electrode, the first electrode and the second electrode being configured to generate induced flow from the leading edge of the blade, the control method comprising:
  detecting, by a measurement device, a measurement data related to at least one of an actual output in the wind power generation system, an actual torque in the rotor, or an actual rotation speed of the blades;
  comparing, by a control unit, the actual output in the wind power generation system, the actual torque in the rotor, or the actual rotation speed of the blades with a set output in the wind power generation system, a set torque in the rotor, or a set rotation speed of the blades set in advance at an axial wind velocity when the actual output, the actual torque, or the actual rotation speed is detected; and
  controlling, by the control unit, when the actual output, the actual torque, or the actual rotation speed detected by the measurement device is lower for a predetermined time period than the set output, the set torque, or the set rotation speed, a voltage application mechanism to apply a voltage between the first electrode and the second electrode so as to generate plasma induced flow.

11. The control method for the wind power generation system according to claim 10, the method further comprising:
  comparing by the control unit the actual output in the wind power generation system, the actual torque in the rotor, or the actual rotation speed of the blades detected by the measurement device after the plasma induced flow is generated with a second set output in the wind power generation system, a second set torque in the rotor, or a second set rotation speed of the blades set in advance at an axial wind velocity when the actual output, the actual torque, or the actual rotation speed detected by the measurement device after the plasma induced flow is generated is detected; and
  controlling by the control unit, when the actual output, the actual torque, or the actual rotation speed detected by the measurement device after the plasma induced flow is generated reaches for a predetermined time period the second set output, the second set torque, or the second set rotation speed, the voltage application mechanism to stop applying the voltage to the airflow generation device.

12. The control method for the wind power generation system according to claim 10, wherein the voltage applied by the voltage application mechanism is controlled to perform pulse modulation.

13. The control method for the wind power generation system according to claim 12, wherein the value of a relational expression fC/U is 0.1 or larger and 9 or smaller where f is a pulse modulation frequency of the voltage in the pulse modulation control, C is a chord length of the blades, and U is a relative velocity combining a peripheral velocity of the blades and a wind velocity.

14. The control method for the wind power generation system according to claim 10, in the case where a plurality of the airflow generation devices are provided in a blade span direction in leading edges of the blades, and the plurality of the airflow generation devices are controlled independently, the method comprising:
  comparing by the control unit the actual output in the wind power generation system, the actual torque in the rotor, or the actual rotation speed of the blades detected by the measurement device with the set output in the wind power generation system, the set torque in the rotor, or the set rotation speed of the blades set in advance at an axial wind velocity when the actual output, the actual torque, or the actual rotation speed is detected;
  calculating by the control unit, when the actual output, the actual torque, or the actual rotation speed detected by the measurement device is lower for a predetermined time period than the set output, the set torque, or the set rotation speed, an angle of attack in each blade leading edge where each of the airflow generation devices is provided based on a wind velocity and the actual rotation speed of the blades; and
  controlling by the control unit, when a calculated angle of attack is larger than an angle of attack in each blade leading edge set in advance at a wind velocity and the actual rotation speed of the blades when this angle of attack is calculated, the voltage application mechanism to selectively apply a voltage between the first electrode and the second electrode provided in the blade leading edge for which the calculated angle of attack is larger than the angle of attack set in advance, so as to generate plasma induced flow.

15. The control method for the wind power generation system according to claim 10, in the case where a plurality of the airflow generation devices are provided in a blade span direction in leading edges of the blades, and the plurality of the airflow generation devices are controlled independently, the method comprising:
  applying by the control unit the voltage between the first electrode and the second electrode for a predetermined time period and comparing the actual output in the wind power generation system, the actual torque in the rotor, or the actual rotation speed of the blades detected by the measurement device before and after applying the voltage;
  calculating by the control unit, when the actual output, the actual torque, or the actual rotation speed is increased by the application of the voltage, an angle of attack in each blade leading edge where each of the airflow generation devices is provided based on a wind velocity and the actual rotation speed of the blades; and
  controlling by the control unit, when a calculated angle of attack is larger than an angle of attack in each blade leading edge set in advance at a wind velocity and the actual rotation speed of the blades when this angle of attack is calculated, the voltage application mechanism to selectively apply a voltage between the first electrode and the second electrode provided in the blade leading edge for which the calculated angle of attack is larger than the angle of attack set in advance, so as to generate plasma induced flow.

16. The control method for the wind power generation system according to claim 10, the method further comprising:

applying by the control unit the voltage between the first electrode and the second electrode for a predetermined time period and comparing the actual output in the wind power generation system, the actual torque in the rotor, or the actual rotation speed of the blades detected by the measurement device before and after applying the voltage; and controlling by the control unit, when the actual output, the actual torque, or the actual rotation speed is increased by the application of the voltage, the voltage application mechanism further for a predetermined time period to apply a voltage between the first electrode and the second electrode so as to generate plasma induced flow.

17. A wind power generation system, comprising:

a rotor having a hub and at least two or more blades attached to the hub;

a nacelle pivotally supporting the rotor via a rotation shaft connected to the hub;

a tower supporting the nacelle;

an airflow generation device provided in a leading edge of each of the blades, the airflow generation device having a first electrode and a second electrode which are separated via a dielectric, and capable of generating plasma induced flow;

a voltage application mechanism capable of applying a voltage between the first electrode and the second electrode of the airflow generation device;

a measurement device configured to measure a measured wind direction and a measured wind velocity and detect information related to at least one of output in the wind power generation system, torque in the rotor, or a rotation speed of the blades; and a control unit configured to control the voltage application mechanism based on an output from the measurement device, wherein the control unit is configured to control the voltage application mechanism to adjust the output in the wind power generation system to a predetermined power curve thereof, the power curve represents a relation between an axial wind velocity and an output in the wind power generation system, and the control unit is configured to calculate a calculated axial wind velocity based on the measured wind direction and the measured wind velocity so as to control the voltage application mechanism to adjust the output in the wind power generation system to a value on the power curve at the calculated axial wind velocity when the output in the wind power generation system deviates from the power curve.

* * * * *